Dec. 28, 1965 S. J. GARTNER ET AL 3,225,659
CAM CUTTING MACHINE AND METHOD
Filed Aug. 13, 1963 13 Sheets-Sheet 1
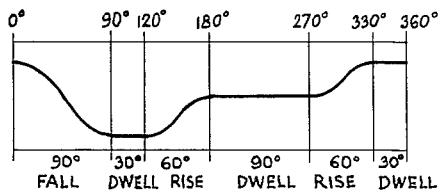
FIG. 4.
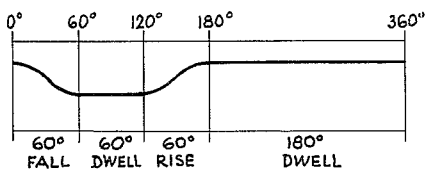
FIG. 2.
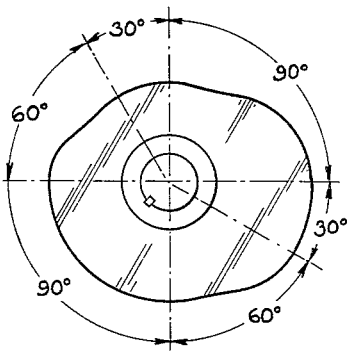
FIG. 3.
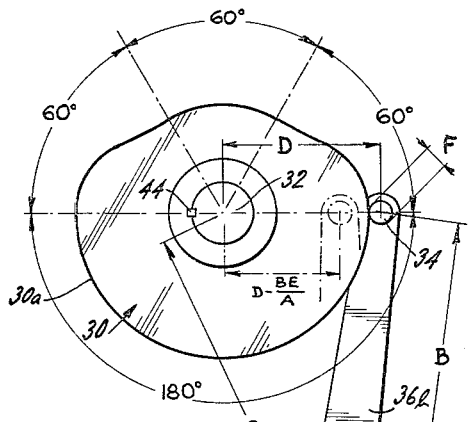
FIG. 1.
FIG. 5.
INVENTORS
STANLEY J. GARTNER
JAMES E. MOREAN
BY
Amster + Levy
ATTORNEYS

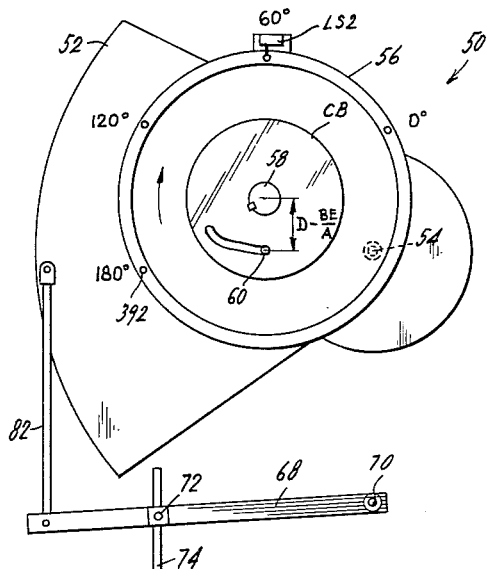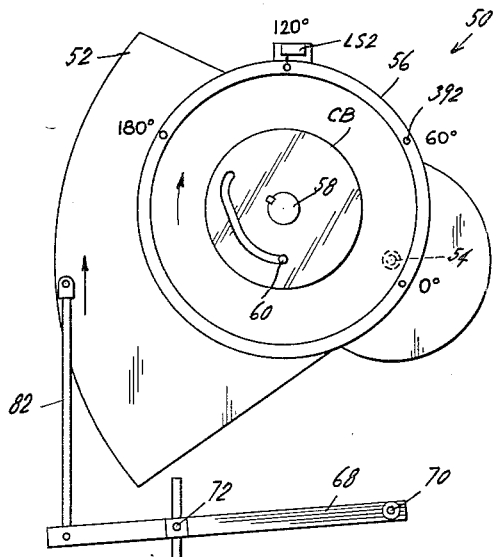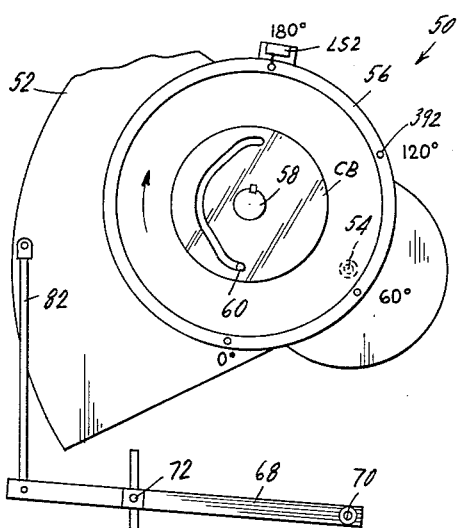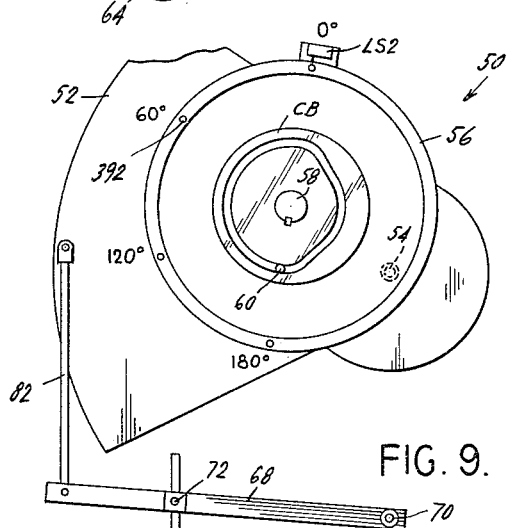

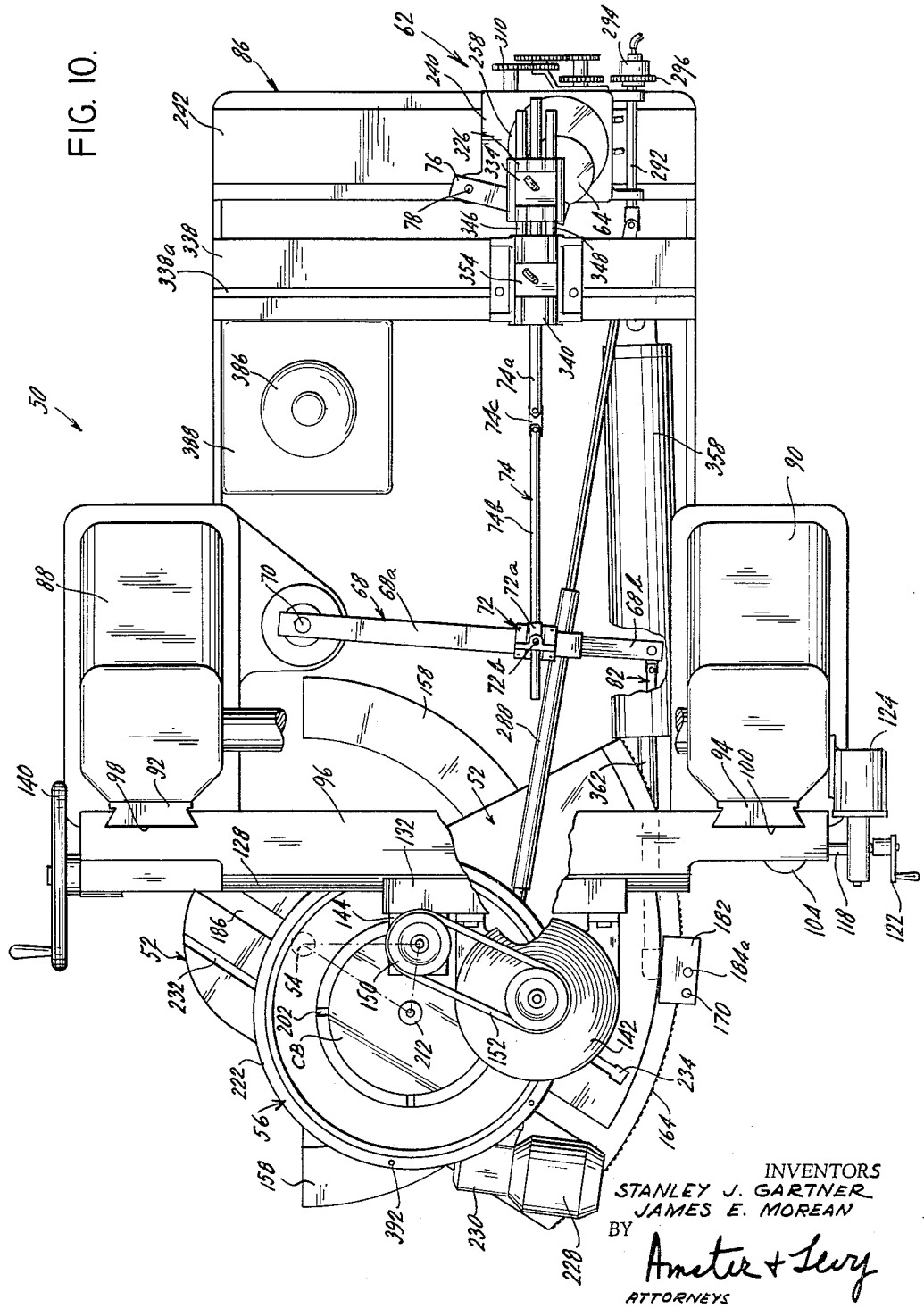

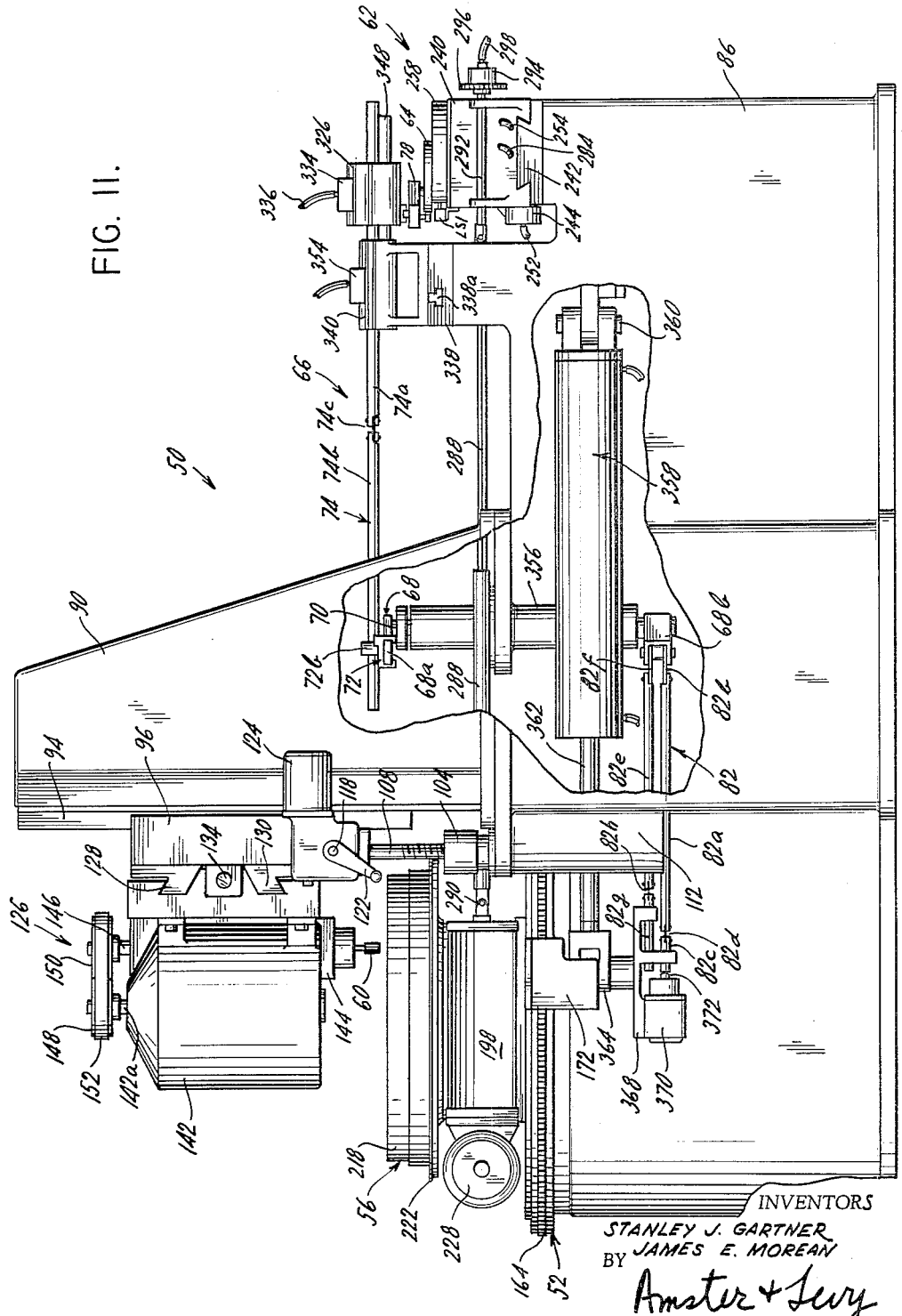

Dec. 28, 1965

S. J. GARTNER ETAL 3,225,659

CAM CUTTING MACHINE AND METHOD

Filed Aug. 13, 1963

INVENTORS
STANLEY J. GARTNER
JAMES E. MOREAN
BY
Amster & Levy
ATTORNEYS

Dec. 28, 1965   S. J. GARTNER ETAL   3,225,659
CAM CUTTING MACHINE AND METHOD
Filed Aug. 13, 1963   13 Sheets-Sheet 6

Dec. 28, 1965    S. J. GARTNER ETAL    3,225,659
CAM CUTTING MACHINE AND METHOD
Filed Aug. 13, 1963    13 Sheets-Sheet 7

INVENTORS
STANLEY J. GARTNER
JAMES E. MOREAN
BY
Amster + Levy
ATTORNEYS

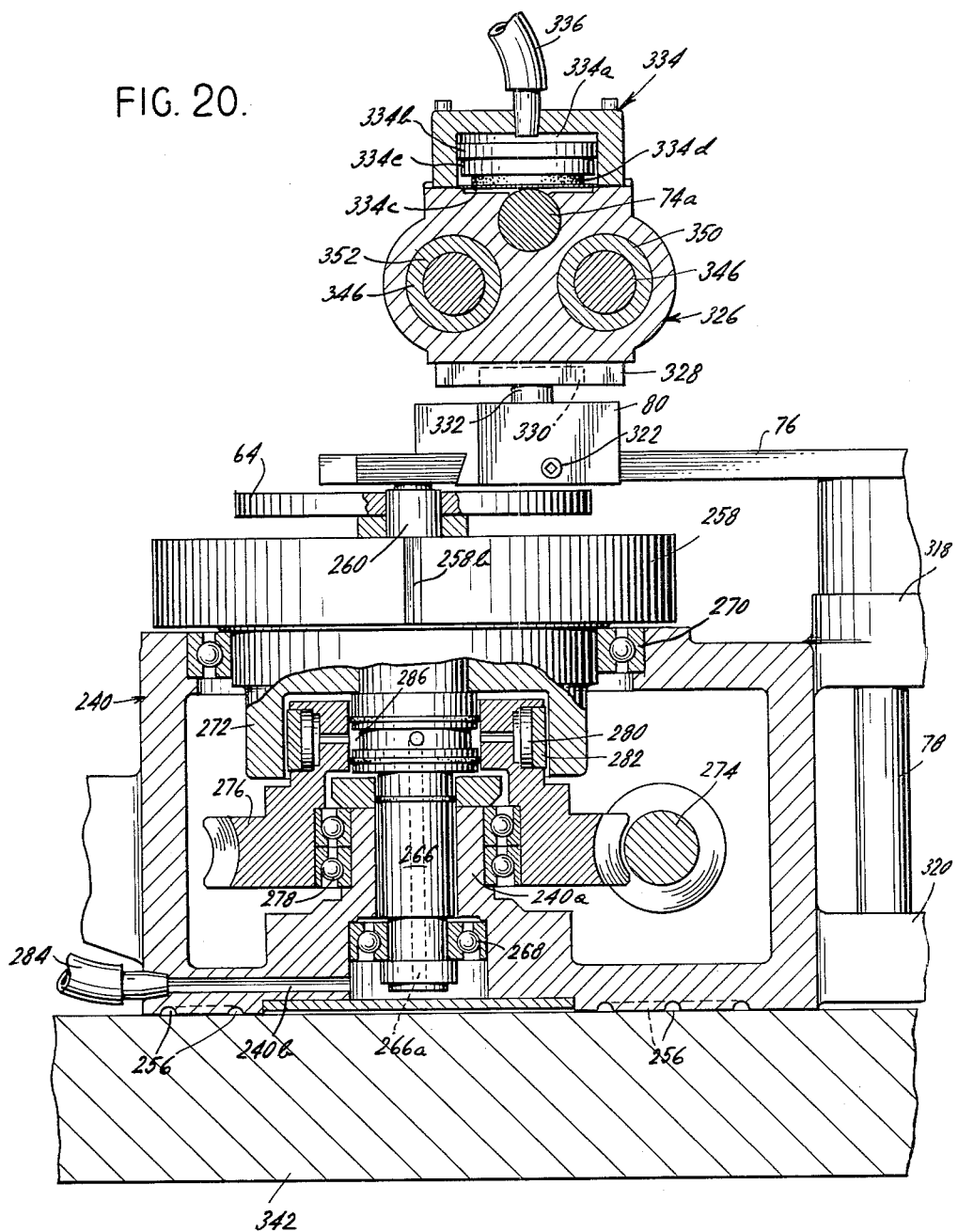

INVENTORS
STANLEY J. GARTNER
JAMES E. MOREAN
BY
Amster & Levy
ATTORNEYS

Dec. 28, 1965  S. J. GARTNER ETAL  3,225,659
CAM CUTTING MACHINE AND METHOD
Filed Aug. 13, 1963  13 Sheets-Sheet 13
FIG. 21c.
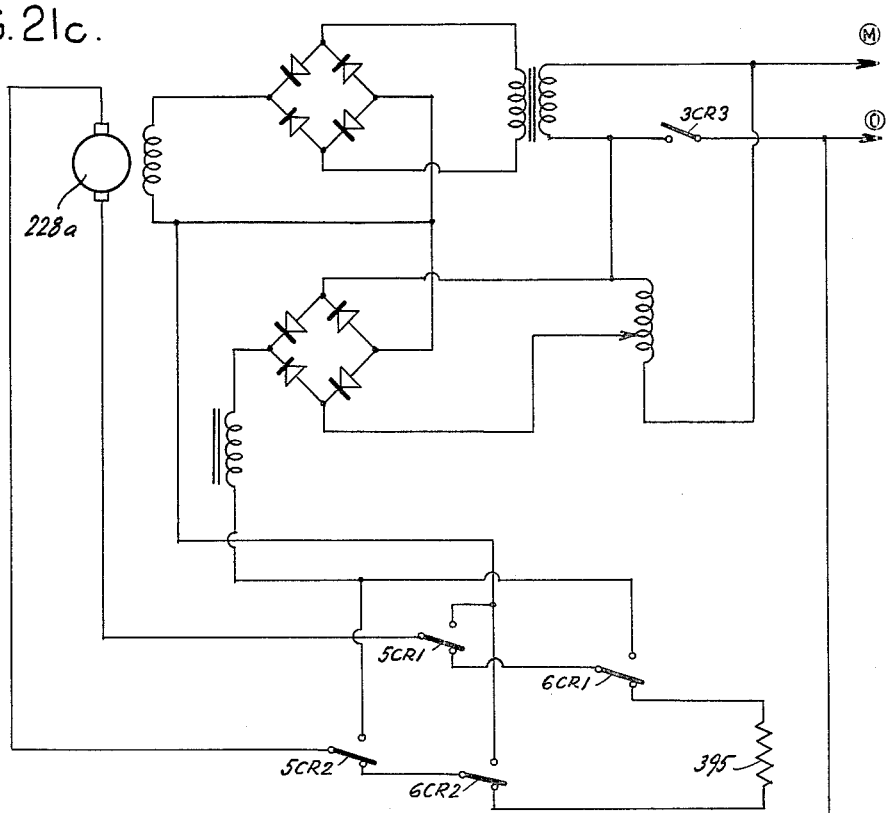
FIG. 22.
FIG. 23.
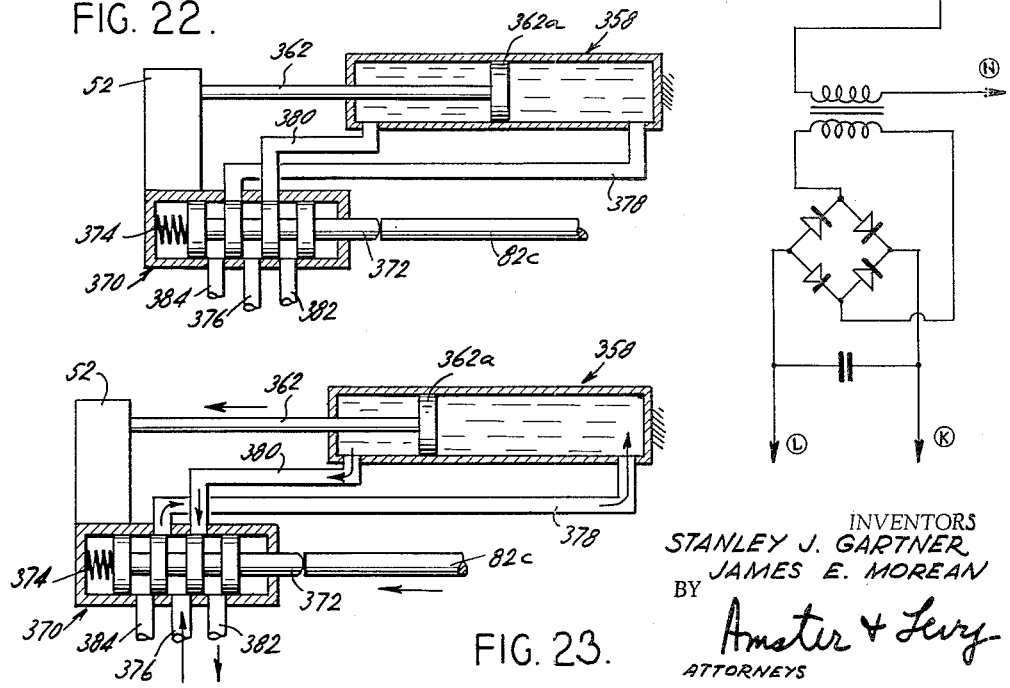
INVENTORS
STANLEY J. GARTNER
JAMES E. MOREAN
BY
Amster & Levy
ATTORNEYS United States Patent Office 3,225,659
Patented Dec. 28, 1965

3,225,659
CAM CUTTING MACHINE AND METHOD
Stanley J. Gartner, Emporium, and James E. Morean, Austin, Pa., assignors to Sylvania Electric Products Inc., New York, N.Y.
Filed Apr. 13, 1963, Ser. No. 301,854
17 Claims. (Cl. 90—13.7)

The present invention relates generally to metal-working equipment and methods, and in particular to a machine and method for developing and cutting a cam under environmental conditions simulating that of the actual working environment for such cam.

In a typical cam-control system, a cam is mounted on a cam shaft providing a cam pivot or center and is formed with a developed peripheral cam track. A cam follower or roller mounted on a follower lever engages the peripheral cam track. A linkage including a follower lever transmits the desired motion from the cam and follower to the mechanism to be controlled at an output or work point. As is generally understood, rotation of the cam is timed to coincide with the desired mechanism cycle and, in effect, the cam repeats a continuously varying function which may be resolved into $x$ and $y$ coordinates.

In such cam-control systems, it is frequently necessary to provide relatively complex motions which must be closely controlled to assure high efficiency operation at desired manufacturing speeds. Normally, the requirement for higher speed manufacturing operations is accompanied by a requirement for cams of higher accuracy. The cam-control system may consist of a follower mechanism which is relatively simple or which involves complex levers and slides arranged to deliver controlled motion at the output or work point, at which it may be necessary to generate motion of harmonic, parabolic or differential forms. As is generally understood, the actual development diagram of the cam which actuates the cam and follower will usually differ from the motion diagram at the output or work point. It is therefore necessary to make rather lengthly calculations to prepare a development diagram for the cam and to take into account the geometrical arrangement and proportions of the cam, cam follower and motion transmission mechanisms. Notwithstanding such computations, errors are introduced due to the inability to mathematically take into account the geometry of the follower mechanism which errors contribute to differentials of both time and in magnitude between the input motion as produced by the mathematically developed cam and the desired functional motion at the output or work point.

Broadly, it is an object of the present invention to provide an improved method and apparatus for developing and cutting cams which obviates one or more of the aforesaid difficulties. Specifically, it is within the contemplation of the present invention to provide a method and machine for cutting and generating cams under the environmental conditions of the ultimate use for the cam.

It is among the objects of the present invention to provide a cam-generating machine and method which facilitates the production of a wide variety of cams, enables the development and cutting of such cams in comparatively short periods of time, and affords the facility for generation of exceptionally accurate controls at the output or workpoint of a cam-control system.

In accordance with apparatus aspects of the present invention, the present cam-generating machine cuts a cam for use in a working environment which includes follower and motion transmitting means and comprises a work-supporting turntable rotatable about a turntable axis and having engagement means to secure a cam blank to the turntable coaxially thereof for rotation about the cam blank axis. A cutting tool is oriented parallel to the turntable axis, with provision for mounting the turntable and the cutting tool for displacement relative to each other. An analog linkage system is connected to one of the turntable and the cutting tool for causing relative displacement therebetween as the cam blank is rotated about the cam blank axis. Means coordinate the rotation of the turntable and the operation of the curve generator and respective drive means are operatively connected to the turntable and to the cutting tool.

In accordance with method aspects of the present invention, there is provided a process for cutting a cam of the type which is mounted on a rotating cam shaft and is operatively engaged by a follower mounted on a rocker arm to produce a desired functional motion along an output motion path at an output point on a rocker arm which includes the steps of rotating the cam blank on a cam axis corresponding to the axis of the rotating cam shaft, engaging the cam blank with an operating cam cutting tool as the cam blank is rotated, constructing an analog of the rocker arm and follower including their orientation relative to the rotating cam shaft and the angle between the output motion path and the rocker arm, and displacing the axis of the cam blank and the cam-cutting tool relative to each other as the cam-cutting tool is engaged with the cam blank by introducing the desired functional motion along the output motion path of the analog as a function of the rate of rotation of the cam blank about its axis.

From the foregoing it will be appreciated that the instant cam generator simulates the actual working environment for the cam-control system and establishes a precise geometric relationship within the machine to the geometric environment of the cam in actual use and to the desired output motion. The cam blank is mounted and rotated on the turntable about the turntable axis which corresponds to the location of the cam shaft in the working environment. In the actual machine, the cutting or milling tool may be of the same diameter as the cam follower so that the cutting duplicates the motion of the follower in the simulated environment. Adjustments are provided within the machine to enable the establishment of the geometric simulation of the follower and motion transmitting means in the actual operating environment. The generated cam produced according to the invention may combine one or more pure curve forms within any number of degrees of angular displacement of the cam, with the curve forms including modified trapezoid, cycloidal, harmonic and parabolic curves. It is possible to also generate a large variety of special mathematically defined curves in accordance with ultimate requirements for the output or functional motion.

The above brief description, as well as further objects, features and advantages of the present invention will be more fully appreciated by reference to the following detailed description of one typical cam generating and cutting machine illustrating features of the present invention, when taken in conjunction with the accompanying drawings, wherein:

FIG. 1 is an elevational view of a typical developed circular cam and associated follower mechanism, both of which are labeled to indicate the respective design parameters required for the development of cam in accordance with the present invention;

FIG. 2 relates to FIG. 1 and is a functional motion chart of a typical output motion to be developed into a cam, with the radial displacement being shown on the x coordinate and the time or angular displacement being shown on the y coordinate;

FIG. 3 is an elevational view of a further illustrative cam which may be automatically developed in accordance with the present invention;

FIG. 4 is a function motion chart for the cam illustrated in FIG. 3;

FIG. 5 is a diagrammatic and schematic plan view of the cam developing and cutting machine, shown at the start of a typical production run for the illustrative cam shown in FIG. 1 and its corresponding function motion chart shown in FIG. 2 at the zero degree angular position;

FIG. 6 is a schematic diagrammatic view similar to FIG. 5, but showing the machine at the end of the cutting of the 60° fall and corresponding to the 60° angular position on the chart of FIG. 2;

FIG. 7 is a view similar to FIG. 6, but showing the machine after cutting the 60° dwell and corresponding to the 120° angular position on the chart of FIG. 2;

FIG. 8 is a view similar to FIG. 7, but showing the machine after cutting of the 60° rise and corresponding to the 180° angular position on the chart of FIG. 2;

FIG. 9 is a view similar to FIG. 8 after cutting of the 180° dwell and corresponding to the 360° angular position on the chart of FIG. 2;

FIG. 10 is a plan view, with parts broken away, of a typical machine embodying features of the present invention;

FIG. 11 is a side elevational view, with parts broken away, of the machine taken from the right side thereof;

FIG. 20 is an enlarged sectional view, taken substantially along the line 20—20 in FIG. 18 and looking in the direction of the arrows, with parts broken away and sectioned;

Figure 21A:
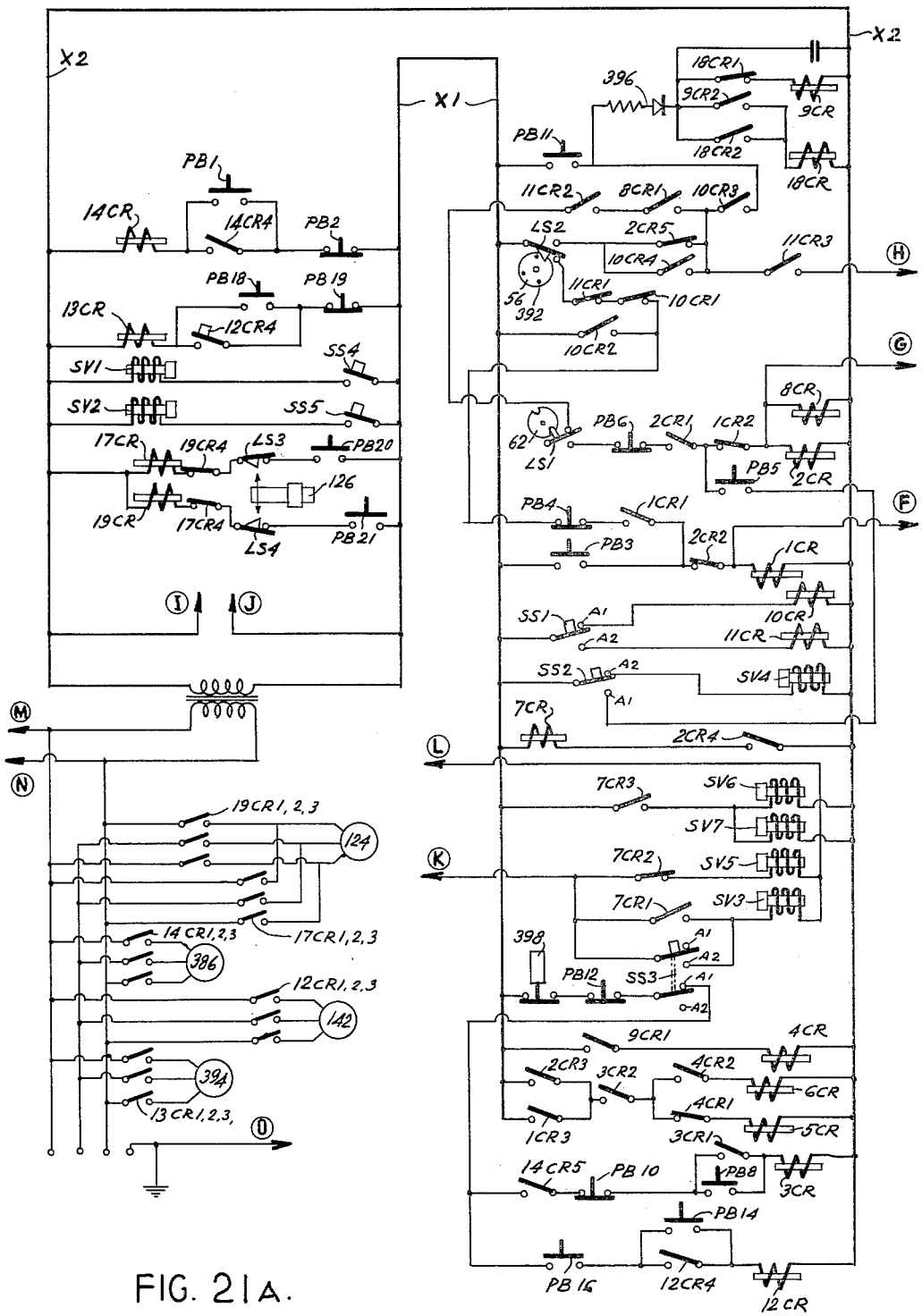
Figure 21B:
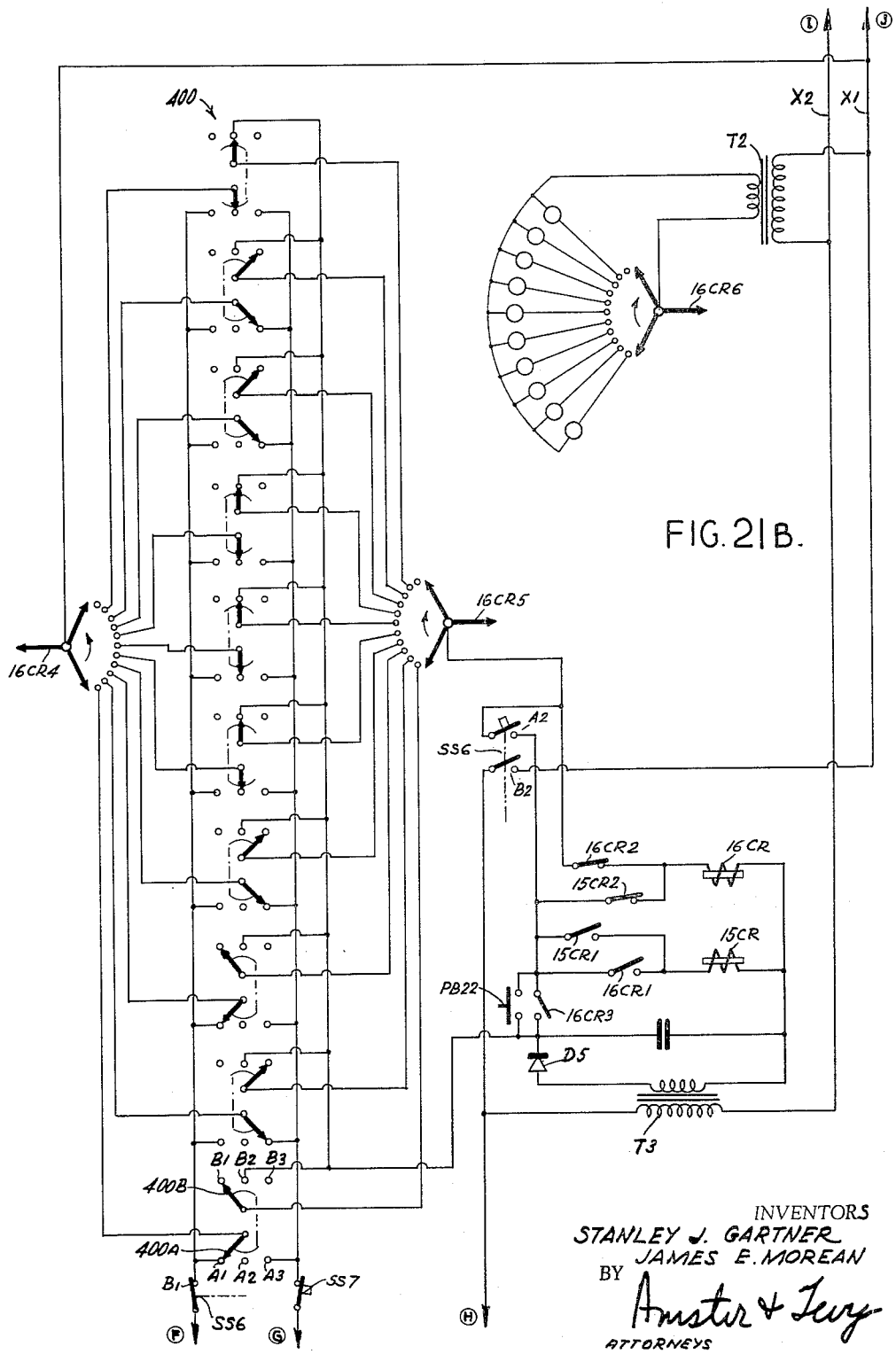

FIGS. 21A, 21B, and 21C is a schematic diagram of the control embodied in the instant machine;

FIG. 22 is a diagrammatic representation of a portion of the servo mechanism embodied in the instant machine which includes a multiple-port valve associated with a hydraulic work cylinder the servo mechanism being shown in the neutral position; and, FIG. 23 is a view similar to FIG. 22, but showing the work cylinder during an operative stroke and the corresponding setting of associated multiple-port valve.

Before detailed reference to FIGS. 10 through 23 for a description of the typical cam developing and cutting machine 50 in accordance with the present invention, preliminary reference will be made to FIGS. 1 through 9 inclusive which schematically and diagrammatically demonstrate functional aspects of the present machine and should enable a more ready understanding of the invention.

In FIG. 1, there is shown a typical developed radial cam 30 having a peripheral cam track 30a. The cam 30 is mounted on a cam shaft 32 providing a cam pivot or center. The peripheral cam track 30a is engaged by a cam follower or roller 34 which is journaled on a double-arm lever 36 having a lever pivot 38 spaced from the cam shaft 32 and including a rocker arm 36a and a follower arm 36b. The follower arm 36b rockably mounts the cam follower or roller 34 to follow the contour of the peripheral cam track 30a, while the rocker arm 36a delivers controlled motion, both with respect to stroke and acceleration, at the output or work point 40 which is coupled to a cam-driven element by the coupling link or rod 42.

If the illustrated cam and follower mechanism shown in FIG. 1 were to be developed by presently available cam manufacturing techniques, the designer would proceed substantially as follows:

First, the designer would determine what the generated motion should be at the output or work point 40 which of course would depend upon the particular environment in which the cam is to be employed. Thereupon, employing mathematical formulae and known geometric principles, the designer would prepare a conventional cam development which is a linear (rather than circular) layout of the actual rises and falls which form the successive lobes of the peripheral cam track 30a. In order to accurately reproduce the desired motion at the output or work point 40, it would be necessary to make a relatively large number of computations. For example, to properly cut a 60° rise, it is not unusual to make calculations for each degree thereof. Although computers may be employed to greatly reduce the time of such calculations, the designer is still required to initially set up the mathematical function. Thereupon, using the engineering data prepared by the designer, an actual cam development is prepared which in turn is employed on a conventional vertical milling machine to mill a cam master in accordance with such cam development. The result of this milling operation is a series of milled points at prescribed angular spacings relative to each other (i.e. at 1° spacings if that was the basis upon which the original computations were made). Thereupon, a skilled specialist manually files the milled points to produce an approximation of the desired cam path or contour, the accuracy of which depends largely upon the skills of the specialist and which is not a truly generated cam master. The cam master is then employed on conventional cam-cutting or tracer equipment to produce the actual working cam.

It will be appreciated that the aforesaid operations are exceptionally laborious and represent relatively high engineering and machine time costs. Further, the resulting cam development will not necessarily produce the precise output motion at the output or work point in that it is not always practical to take into account the precise follower geometry in making the mathematical computations used to produce the actual cam development. However, as a practical matter, the need does exist for precise cams to produce closely controlled working strokes at prescribed rates at an output or working point to insure reliable operation and permit high speed coordinated controls in relatively complicated automated equipment.

In accordance with the present invention, the design parameters required for the generation and cutting of cams includes the geometry of the cam and follower mechanisms and a functional motion chart of the output stroke at the output or work point. More particularly, for the illustrative cam and follower mechanisms shown in FIG. 1 and its functional motion chart shown in FIG. 2, the following design dimensions or parameters are required:

(A) The length of the rocker arm 36a as measured from the center line of the lever pivot 38 to the output or work point 40.

(B) The length of the follower arm 36b as measured from the center line of the lever pivot 38 to the center line of the follower 34.

(C) The distance between the center line of the cam shaft or pivot 32 and the center line of the lever pivot 38.

(D) The distance between the center line of the cam shaft or pivot 32 and the maximum throw of the center line of the cam follower 34, which corresponds to the maximum rise of the cam 30.

(E) The length of the output stroke or functional motion.

(F) The diameter of the cam follower which usually corresponds to the diameter of the final cam-cutting tool.

(G) The included angle between the center line of the rocker arm 36a, as measured between the lever pivot 38 and the work point 40, and the center line of the link or coupling rod 42.

With the foregoing information, the present cam developing and cutting machine 50 actually simulates the working environment of the cam and follower mechanisms including the functional motion at the output or work point 40 and automatically develops and cuts a working cam track 30a for the cam 30 which will produce, invariably and precisely, the absolute output motion or work stroke E at whatever rate is required in accordance with the ultimate design.

The cam developing and cutting machine 50 includes a work table 52 which is mounted for rocking movement about a vertical work table pivot 54. In the physical arrangement of the machine 50, the work table pivot 54 will be arranged to correspond to the lever pivot 38; and the rocking movement of the work table 52 is in timed relation to the angular displacement of the cam blank to produce the rises and falls or lobes for the cam 30.

Mounted on the work table 52 is a rotary work-supporting turntable 56 which has removably attached thereto a cam blank CB which is rotatable about a central turntable shaft 58. In the physical arrangement of the machine 50, the turntable shaft 58 is arranged to correspond to the location of the cam shaft 32 of the working environment for the cam 30; and the turntable 56 rotates about the turntable shaft 58 at the desired angular feed rate for cam cutting.

A cutter tool 60 is journaled on a cutter head (not shown) to turn at high speed about its axis for milling the cam 30 and functions much like a conventional milling machine. The cutter tool 60 is mounted for vertical movement toward and away from the work-supporting turntable 56 such that it may be brought into an operative position relative to the cam blank CB. In addition, the cutter tool 60 is mounted for horizontal movement towards and away from the work table pivot 54, such that the cutter tool 60 may be brought to a position in the physical environment of the machine corresponding to that of the follower 34 in the working environment, it being recalled that the work table pivot 54 simulates the position of the lever pivot 38.

A curve generator, generally designated by the reference numeral 62, is provided to stimulate the functional motion at the output or work point 40 which is represented by the dimension E. The curve generator 62 can produce virtually any functional motion, provided that the curve form may be mathematically defined and is susceptible of being mechanically reproduced by a corresponding curve standard 64. With a typical curve generator 62, the functional motion produced may be parabolic, harmonic, cycloidal and diverse others. The curve generator 62 is only operative during the developing and cutting of rise and fall portions of the generated curve which define successive lobes. As will be explained, during periods of cutting a dwell, the curve generator is effectively decoupled from the work table 52 and the drive shaft 288.

A system of adjustable links and levers 66 couple the generated motion or curve form from the curve standard 64 of the curve generator 62 to the work table 52 at the required times in the machine cycle. The system 66 includes a tracer arm 68 pivotally mounted at a vertical tracer arm pivot shaft 70. In the machine environment, the tracer arm pivot 70 corresponds to the lever pivot 38 in the working environment. Adjustably mounted on the tracer arm 68 is a slide block 72 which is coupled via tracer linkage 74 to a generator arm 76. The generator arm 76 is rockable about a vertical generator arm pivot 78 which has no counterpart in the working environment and carries an adjustable slide block 80. The tracer arm 68 is coupled to the work table 52 via a servo linkage 82, which will be described in greater detail hereinafter.

Based upon the foregoing generalized description of the cam generator 50, there now follows a brief description of a typical, but nonetheless illustrative procedure, for generating and cutting the cam 30. Although the actual development of the cam 30 is unknown, the cam generator 50 will produce an output motion E at the output or work point 40 in accordance with the functional motion chart FIG. 2. Preliminary to the actual cutting and automatic development of the contour of the peripheral cam track 30a for the cam 30, the following adjustments are made to simulate in the physical environment of the cam generator 50, the actual working environment for the ultimate cam:

First, the cutter tool 60 is adjusted relative to the work table pivot 54 to a distance equal to the dimension B which corresponds to the distance between the center line of the lever pivot 38 and the center line of the follower 34. This places the cutter tool 60 at a location corresponding to the follower 34, with the work table pivot 54 serving as a reference and corresponding to the location of the lever pivot 38.

Next, the slide block 72 is adjusted along the tracer arm 68 relative to the tracer arm pivot 70 to a distance equal to the dimension A which corresponds to the distance between the center line of the lever pivot 38 and the output or work point 40 to thereby simulate this aspect of the working geometry and place the pivot on the slide block 72 at a location corresponding to the work point 40. In this connection, it should be noted that the actual shape of the double-arm lever 36 is not material to the simulation thereof in the physical environment of the machine, but rather the important parameters are the dimensions A and B with respect to the lever pivot 38 which is simulated within the machine by the work table pivot 54 and tracer arm pivot 70. Effectively, the curve generator 62 is coupled to the work table 52 by a parallelogram linkage including the tracer arm 68, the servo linkage 82, and the link provided by the work table between its connection to the servo linkage 82 and the work table pivot 54 as the movable links thereof, and the portion of the machine frame between the tracer arm pivot 70 and the work table pivot 54 as the stationary link thereof.

Next, the included angle between the rocker arm 36a and the link 42 and represented by the notation G is then simulated in the physical environment by pivoting the tracer arm 68 about the tracer arm pivot 70 and making the necessary adjustments in the alignment of the tracer linkage 74, as will be appreciated from the detailed description of the machine. Thereupon, the linkage 74 is clamped to the previously adjusted slide block 72.

Next, the slide block 80 is adjusted along the generator arm 76 relative to the generator arm pivot 78 to a distance of twice the dimension E such that the pivot on the block 72, which simulates the movement of the output or work point 40, will be displaced through the dimension E as a function of the motion imparted thereto from the curve generator 62. In a typical curve generator 62, the swing of the follower on the generator arm 76 which follows the curved standard 64 for 180° of rotation thereof is four inches. Therefore, the geometry of this system is such that the distance between the slide block 80 and the generator pivot 78 must be double the desired output stroke E to product a motion exactly corresponding to the output E at the simulated work point on the slide block 72.

Next, a changeable gear train within the machine is set up to produce the initial 60° fall at a rate determined by the curve standard 64 and within 180° of rotation of such curve standard. The details of the setup for the gear train will be more fully appreciated from the detailed description which follows.

Next, the rotary work-supporting turntable 56 is adjusted relative to the work table pivot 54 such that the center line of the turntable shaft 58 is spaced from the work table pivot 54 by the dimension C which thereby provides, in the simulated machine environment, a condition corresponding to the working environment wherein the dimension C is the distance between the center line of the cam shaft 32 and the center line of the lever pivot 38.

Finally, the work table 52 is rocked about the work table pivot 54 to a starting position wherein the center line of the turntable shaft 58 is spaced from the center line of the cutter tool 60 at a distance equal to the dimension D which corresponds to the maximum throw of the cam as measured from the center line of the cam shaft 32 to the center line of the cam follower 34.

From the foregoing, it will be appreciated that in the simulating environment of the machine 50, there has been completed a triangle wherein the apexes represented by the center lines of the work table pivot 54, the turntable shaft 58 and the cutter tool 60 are at locations corresponding to the center lines of the lever pivot 38, the cam shaft 32 and the follower 34. Further, the follower and rocker arms of the double-arm lever 36 are simulated in the machine. Still further, the output motion E and its relationship to the follower are likewise simulated by virtue of the setup of the curve generator 62 and the establishment of the angle G. As will be understood from the subsequent detailed description of the controls certain other circuit conditioning adjustments must be made. However, an understanding thereof is not required for an appreciation of the operation of the cam generator 50 and the cutting of the typical cam to produce the functional motion shown in FIG. 2 in the working environment of FIG. 1.

Successive reference will now be made to FIGS. 5 to 9 inclusive which show successive positions of the cam generator 50. The FIG. 5 position corresponds to the 0° time or displacement on the functional motion chart of FIG. 2; the FIG. 6 position corresponds to the 60° angular position to the chart of FIG. 2; the FIG. 7 position corresponds to the 120° angular position on the chart of FIG. 2; the FIG. 8 position corresponds to the 180° angular position on the chart of FIG. 2; and finally, the FIG. 9 position corresponds to the 360° angular position on the chart.

At the start of operation, the location of the key 44 is in alignment with the cutter tool 60, with the work-supporting turntable 56 having its 0° marking aligned with the sensing microswitch LS2 which is incorporated into the control and initiates successive cam-cutting intervals, as will be detailed hereinafter.

When the cam generator 50 is placed into operation, the turntable 56 will turn about the turntable shaft 58 at a cutting rate which will be initially determined by the size of the cutter 60, the dimension D, the type of material and other variables which are generally understood by those skilled in this art. Simultaneous with the turning of the turntable 56 in the clockwise direction about the turntable shaft 58, the curve generator 62 is placed into operation to rock the work table 52 about the work table pivot 54 to displace the turntable shaft 58 relative to the cutter tool 60 in accordance with the actual functional motion simulated by the curve generator 62 for successive angular positions of the cam blank CB during the developing and cutting of the 60° fall. As may be appreciated by progressively inspecting FIGS. 5 and 6, the curve generator 62 turns through 180° during a corresponding 60° of rotation of the turntable 56 to cut the corresponding segment of the peripheral cam track 30a which will precisely produce the functional motion for the given cam and follower geometry. The actual cam segment produces the 60° fall of the functional motion may or may not occupy 60° of the actual peripheral cam track 30a in that the cam generator 50 automatically compensates in the cam developing and cutting for errors introduced by virtue of the follower geometry.

During the next cam-cutting interval which corresponds to the cutting of a 60° dwell on equal radii from the center of the cam shaft 32 and the coincident turntable shaft 58, the curve generator 62 remains in the low point position awaiting the cutting of the next lobe. By the internal programming of the control, curve generator 62 remain inoperative during a cam-cutting interval sufficient to produce the dwell for 60°, as may be appreciated by progressively inspecting FIGS. 6 and 7 and the corresponding portion of the functional motion chart of FIG. 2. The sensing microswitch LS2 will signal the control at the appropriate time to indicate that the desired 60° dwell has been cut and to initiate the operation of the curve generator 62 and the required rocking of the turntable 52 to develop and cut a 60° rise, during which the curve generator 62 moves from its low-point position shown in FIGS. 6 and 7 to its high-point position shown in FIG. 8.

Finally, as may be appreciated by inspecting FIGS. 8 and 9, the 180° dwell is cut by virtue of the continued rotation of the turntable 56, with the corresponding disengagement or decoupling of the curve generator 62 to thereby complete the cam 30 which will produce the desired functional motion E for the illustrative environment, with the introduction of automatic compensation in the actual configuration of the peripheral cam track 30a to account for variables within the follower system.

As will be appreciated as the description proceeds, virtually any desired functional output motion may be produced, given the geometry of the cam and follower system and a mathematically reproducible functional motion. By simple changeover techniques, which will become more apparent as the description proceeds, it is possible to cut a radial cam of the type generally shown in FIG. 3 to produce the functional motion shown in FIG. 4. For the illustrative functional motion chart of FIG. 4, it should be noted that there are two rises cut between the 120° and 180° angular positions and the 270° and 330° angular positions, with an intermediate dwell. For this type of cam, it is obviously necessary to reset the generator 62 to enable the cutting of two rises in succession. The illustrative motion chart of FIGS. 2 and 4 and the corresponding motions which may be accurately reproduced on cams in accordance with the present invention.

Figure 12:
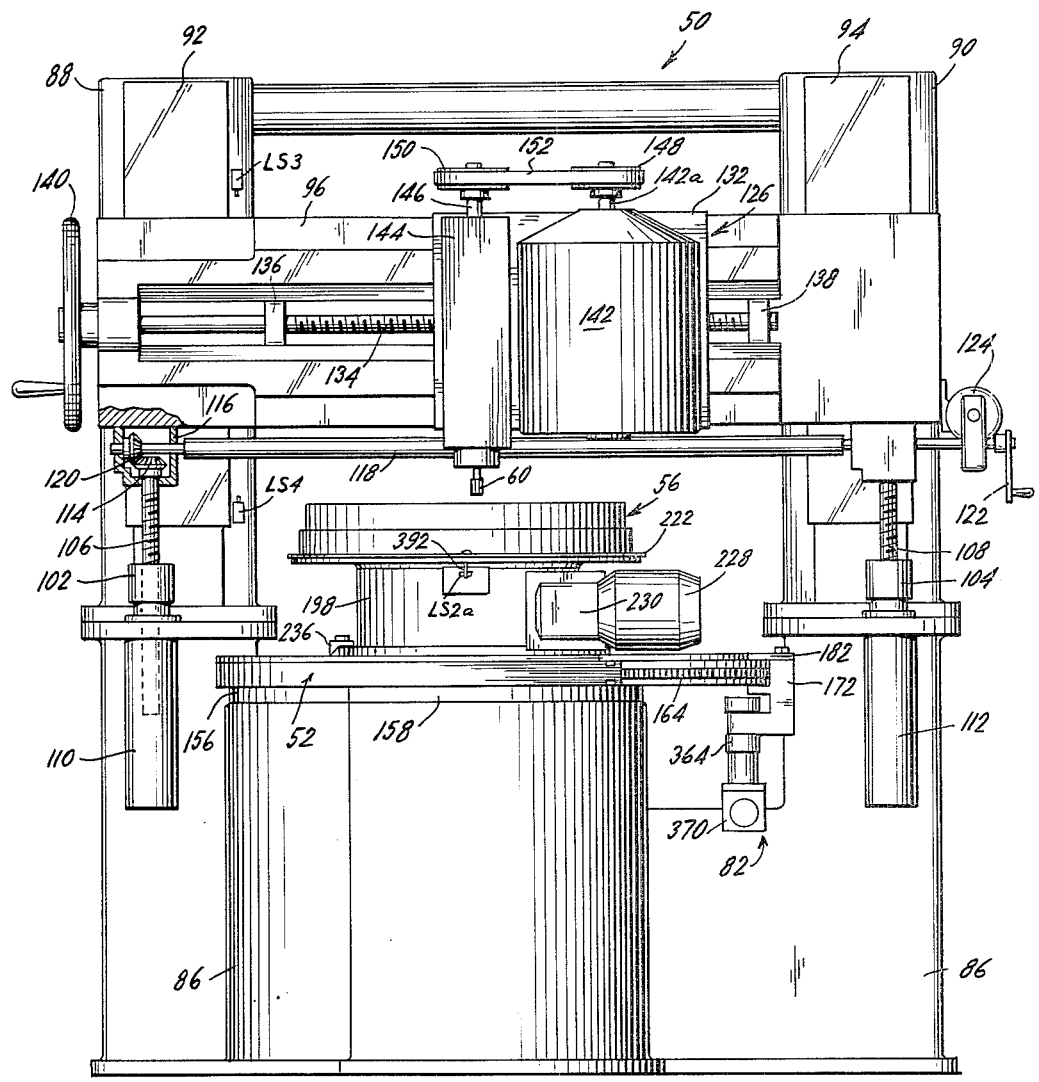
FIG. 12 is a front elevational view of the machine taken from the operator's position.

Referring now to FIGS. 10 to 12 inclusive, the cam generator 50 is seen to include a machine frame or casting, generally designated by the reference numeral 86, which includes uprights 88, 90 at opposite sides thereof. Mounted on the uprights 88, 90 are vertically extending ways 92, 94 which mount a cutter cross-head 96 for vertical adjustment such that the cutter tool 60 may be moved into and out of a cutting or milling position relative to the cam blank CB on the work-supporting turntable 56. Specifically, the cutter cross-head 96 is formed with dovetails 98, 100 (see FIG. 10) which engages the respective vertical ways 92, 94. Provision is made to vertically adjust the cross-head 96 and the cutter tool 60, both under power and manually. As seen best in FIG. 12, stationary lead nuts 102, 104 are mounted on the machine frame 86 on opposite sides of the turntable 56 and receive respective vertically movable lead screws 106, 108 which extend downwardly into depending covers 110, 112 on the machine frame 86. At their upper ends, the lead screws 106, 108 carry respective bevel gears, such as the gear 114 on the lead screw 106 received within the gear housing 116. The bevel gears on the lead screw 106, 108 are coupled together by a cross shaft 118, as by the bevel gear 120 engaging the gear 114 on the upper end of the lead screw 106. The cross-shaft 118, the respective gear housings and the meshing bevel gears associated with each lead screw 106, 108 are mounted on the cross-head 96. By turning the cross shaft 118, as by hand wheel 122, the cross-head 96 may be raised and lowered. At the end of the cross shaft 118 remote from the hand wheel 122, there is provided a gear reductor motor 124 which is geared to the cross shaft 118 for raising and lowering the cross-head 96 under power. An appropriate push button control is provided for selectively actuating the motor 124.

Mounted on the cross-head 96 is the cutter assembly, generally designated by the reference numeral 126, which is adjustable side to side of the machine along the cross-head 96 to permit the cutter tool 60 to be adjusted relative to the work table pivot 54 for the setting of the dimension B. The cross-head 96 carries horizontally extending dovetail ways 128, 130, best seen in FIG. 11 and disposed one above the other and in spaced relation. The cutter assembly 126 includes a base plate 132 which is formed with corresponding dovetails which receive the respective ways 128, 130 to permit side to side adjustment of the entire cutter assembly 126 relative to the cross-head 96. This adjustment is made manually by the provision of a lead screw and follower arrangement which includes a relatively stationary but notable lead screw 134 journalled on the cross-head 96 between ways 128, 130 on bearings 136, 138. The lead screw 134 is threaded through a follower or nut (not shown) carried on the rearward side of the base plate 132. The lead screw 134 is extended to one side of the machine, namely to the left side when viewed from the front (see FIG. 12), and carries a hand wheel 140 which enables the turning of the lead screw and the corresponding side to side adjustment of the cutter assembly 126.

The cutter assembly 126 includes a variable speed drive 142 which is mounted on the base plate 132 and is of any appropriate design, such as a level and VARIATOR or similar unit which will provide a variable speed drive at the output shaft 142a thereof. Mounted on the base plate 132 parallel to the variable speed drive 142 is a heavy duty, precision spindle assembly which comprises a spindle housing 144 having journalled therein a vertically extending spindle or cutter shaft 146. The cutter shaft 146 is coupled to the output shaft 142a of the variable speed drive 142 by a positive drive timing belt including pulley 148 keyed to the shaft 142a, pulley 150 keyed to the spindle shaft 146 and the timing belt 152 trained thereabout. From the foregoing, it will be appreciated that the cutter tool 60 may be both raised and lowered with respect to the work, either manually or under power, and shifted toward and away from the work table pivot 54.

Figure 13:
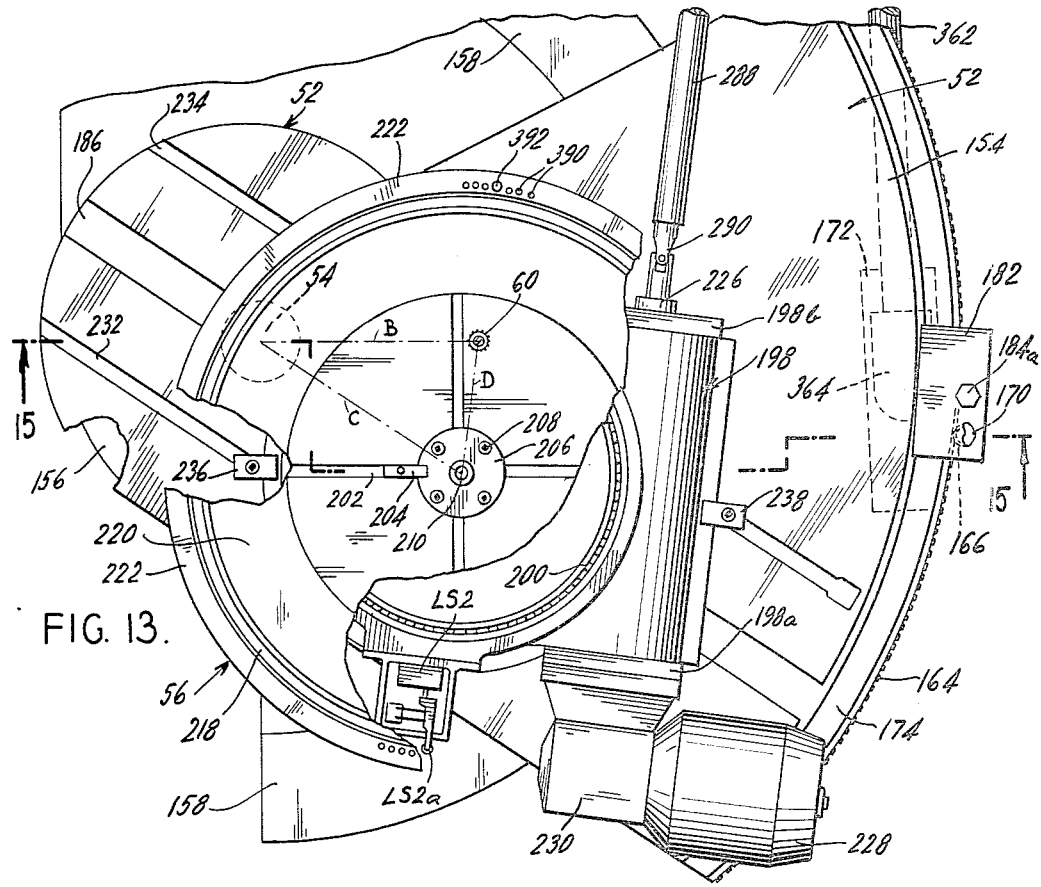
FIG. 13 is a fragmentary plan view, on an enlarged scale and with parts broken away, showing the details of the work table and the work-supporting turntable.
Figure 14:
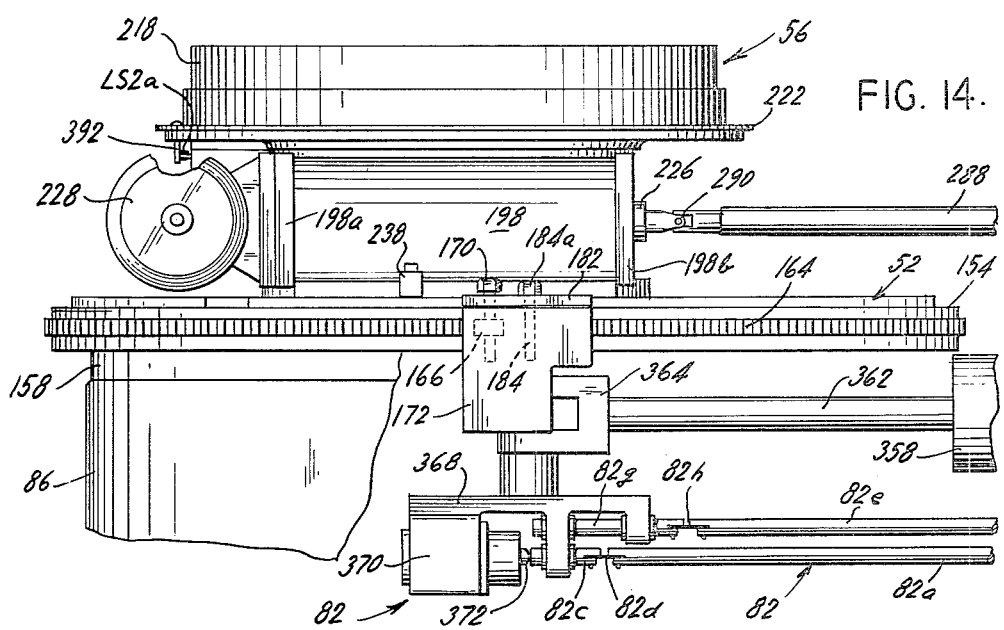
FIG. 14 is a side elevational view, with parts broken away, taken from the right of FIG. 13 and showing further details of the work table and the work-supporting turntable.
Figure 15:
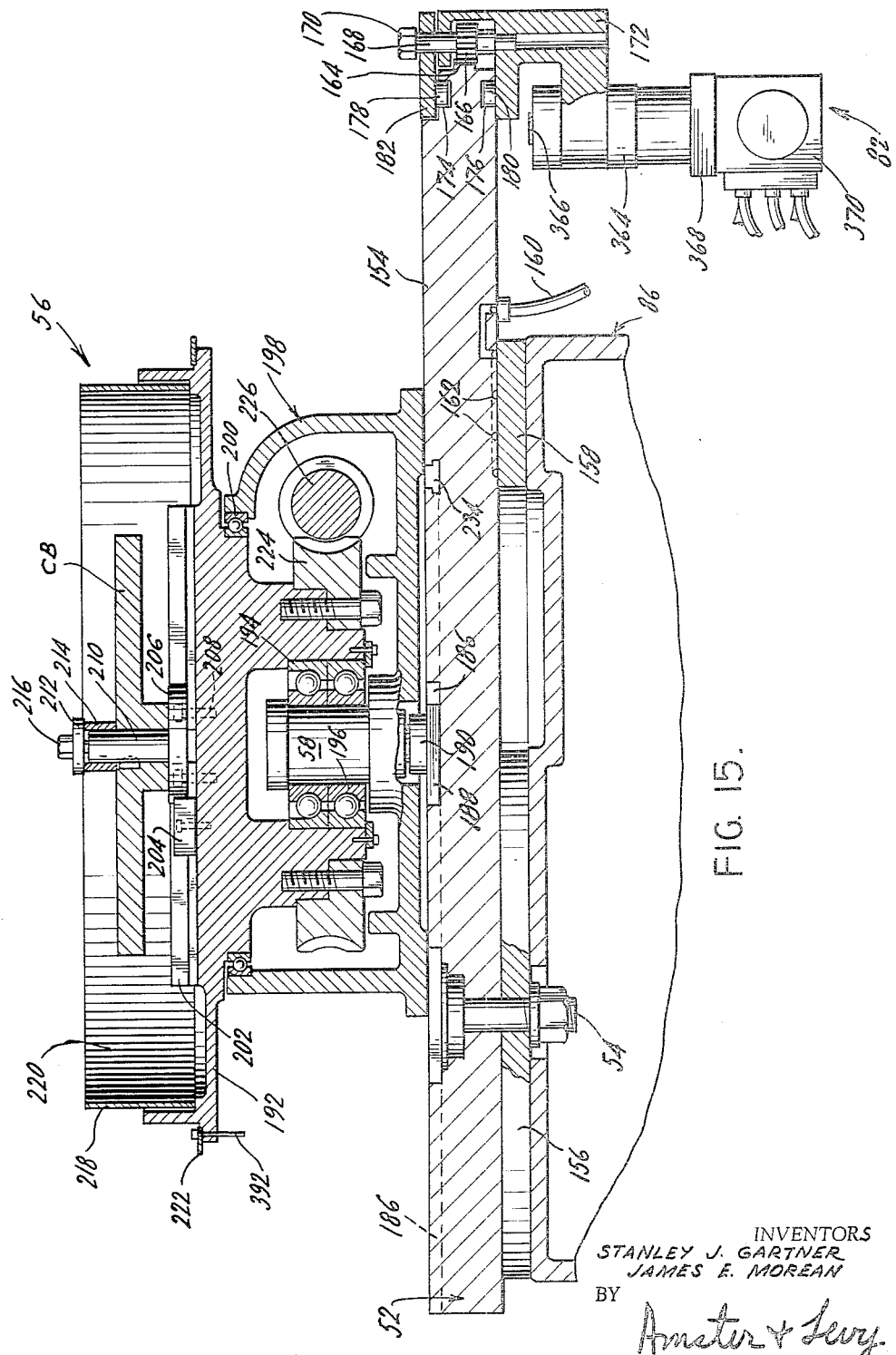
FIG. 15 is a sectional view, on an enlarged scale, taken substantially along the line 15—15 in FIG. 13 and looking in the direction of the arrows.

Referring now specifically to FIGS. 13 to 15 inclusive, there now follows a description of the details of the work table 52 and the work supporting turntable 56 and its adjustable mounting on the work table 52. As seen in FIG. 15, the body 154 of the work table 52 is mounted on the machine frame 86 by a circular bearing plate 156 which surrounds the work table pivot 54 and an arcuate bearing rail 158 which extends along the path of the rocking adjustment or movement of the work table 52 to support the same. Provision is made to pneumatically cushion the movement of the table body 154 relative to the underlying bearing rail 158 to minimize drag therebetween and enable the more accurate following of the motion imparted to the work table 52 from the curve generator 62. Specifically, the pneumatic cushion includes an air-inlet tube 160 which is connected to an air supply and is ported through a series of cutouts 162 formed in the underside of the table body 154 overlying the bearing rail 158 and of an arcuate extent commensurate with the arc of the bearing rail 158 to thereby afford cushioning in various positions of adjustment of the work table 52 relative to the bearing rail 158. The table body 154 is formed with a peripheral adjusting rack 164 which extends on an arc about the work table pivot 54 and is engaged by a meshing adjusting gear 166 fixed to an adjusting shaft 168 having an adjusting head 170. The assembly of the gear 168 and its shaft are journalled on a bracket 172 which is movably mounted on the table body 154. Specifically, and as seen best in FIGS. 14 and 15, the opposite faces of the table body 154 contiguous to the adjusting rack 164 are formed with arcuate guideways 174, 176 paralleling the rack 164 which receive pairs of guide rollers 178, 180. The guide rollers 178 are mounted on a clamping plate 182, while the guide rollers 180 are mounted on an extension of the bracket 172 which underlies the table body 154. The bracket 172 is coupled to the servo linkage 82 in a manner to be subsequently described. Disposed in spaced parallel relation to the adjusting shaft 168 is a lock shaft 184 which extends through the clamping plate 182 and is tapped into the bracket 172. Thus, after adjusting the position of the work table 52 to read the dimension D into the machine environment, the lock shaft 184, through its upwardly projecting head 184a, may be tightened down to clamp the work table 52 in the desired adjusted position coupled to the servo linkage 82.

The upper face of the table body 154 is formed with an elongated keyway 186 extending in the direction of the C dimension which receives a key 188 having a boss 190 which mounts the turntable shaft 58 and permits movement thereof relative to the work table pivot 54 to adjust the C dimension in the stimulated environment. As seen in FIG. 15, the work-supporting turntable 56 includes a turntable base or casting 192 which is journalled by bearings 194, 196 on the turntable shaft 58. In order to provide lateral stability to the turntable base 192, there is provided a housing 198 which surrounds the turntable shaft 58 and provides an enclosure for drive gearing which rotates the turntable 56 about the turntable shaft 58. A top support bearing 200 is provided between the turntable base 192 and the adjacent upper end of the housing 198. The turntable base 192 is formed on its upper face with four radially extending keyways which are of T-shaped cross section, one such keyway being designated generally by the reference numeral 202. The T-shaped keyway 202 receives a key 204 which engages an arbor 206 which is attached to the turntable base 192 by appropriate machine bolts 208. The cam blank CB is releasably attached to the arbor 206 by the provision of an arbor shaft 210 which projects upwardly from the arbor 206 centrally thereof, extends through the cam blank CB and carries a lock washer 212 and spacer sleeve 214 which bears against the cam blank CB and is locked thereagainst by virtue of the arbor bolt 216 threaded into the arbor shaft 210. If the cam blank CB is of the split type, the cam bolts which secure together the two half sections of the cam will radially fasten the cam blank to the arbor shft 210. Additional bolts may be passed through the cam blank CB and engaged in the remaining radially extending keyways in the turntable base contiguous to the outer periphery thereblank CB relative to the turntable base 192 during developing and cutting of the cam. Projecting upwardly of the turntable base contiguous to the outer periphery thereof is an upstanding removable splash guard 218 which defines a well 220 surrounding the cam blank CB which receives a coolant and accumulates the milling chips. About its outer periphery, the turntable base 192 is provided with an angular dial plate 222, preferably having 1° graduations thereabout extending in opposite directions, to enable the precise rotational orientation of the turntable 56 at the start of and during operation, as will subsequently be described.

Provision is made rotating the turntable 56 about the turntable shaft 58 at the desired cutting rate to angularly displace the cam blank CB. Specifically, a worm gear 224 is disposed within the housing 198 and bolted to the underside of the turntable base 192 concentrically of the turntable shaft 58 and is engaged by a worm 226 which is journalled in the end caps 198a, 198b of the housing 198 (see FIG. 13). Mounted on the end cap 198a of the housing 198 is a variable speed drive motor 228 which is connected via reduction gearing 230 to the worm 226 for rotating the turntable 56 at a variable and adjustable speed determined by the desired cutting rate for the cam blank CB. As previously explained, the drive source 228 for the turntable 56 is also employed to motivate the curve generator 62 in timed relation to the rotation of the cam blank CB to rock the work table 52 for the development of the successive lobes of the final cam.

Disposed on opposite sides of the central keyway 186 for the key 188 are clamp guideways 232, 234 which are of T-shaped cross section and receive T-shaped nuts associated with hold-down clamps 236, 238 which are slidable along the respective clamp guideways 232, 234 (see FIG. 13). Thus, after adjusting the turntable shaft 58 relative to the work table pivot 54 in accordance with the C dimension, and rotationally orienting the turntable 56 to optimally locate its driving connection to the curve generator 62, the turntable 56 is clamped to the work table 52 for rocking movement therewith and for simultaneous rotation thereof about the turntable shaft 58 at a rate determined by the drive from the motor 228.

As previously explained in connection with the general description, the curve generator 62 is driven from the same motivating source as employed to rotate the turntable 56 and in turn rocks the work table 52 about the work table pivot 54 in accordance with the functional motion during lobe-cutting intervals. The curve generator 62, which is seen best in FIGS. 16 to 20 inclusive, includes a generator housing 240 which is adjustably mounted on a dovetail rail 242 which extends transversely of the machine at the rearward end of the machine frame 86 (see FIGS. 10 and 18). The side to side adjustment of the generator housing 240 and the mechanisms support thereon permits adjustment of the curve generator 62 to a position wherein the output thereof can be engaged to the tracer linkage 74 which in turn is coupled via the tracer arm 68 to the servo linkage 82 and to the work table 52.

Figure 19:
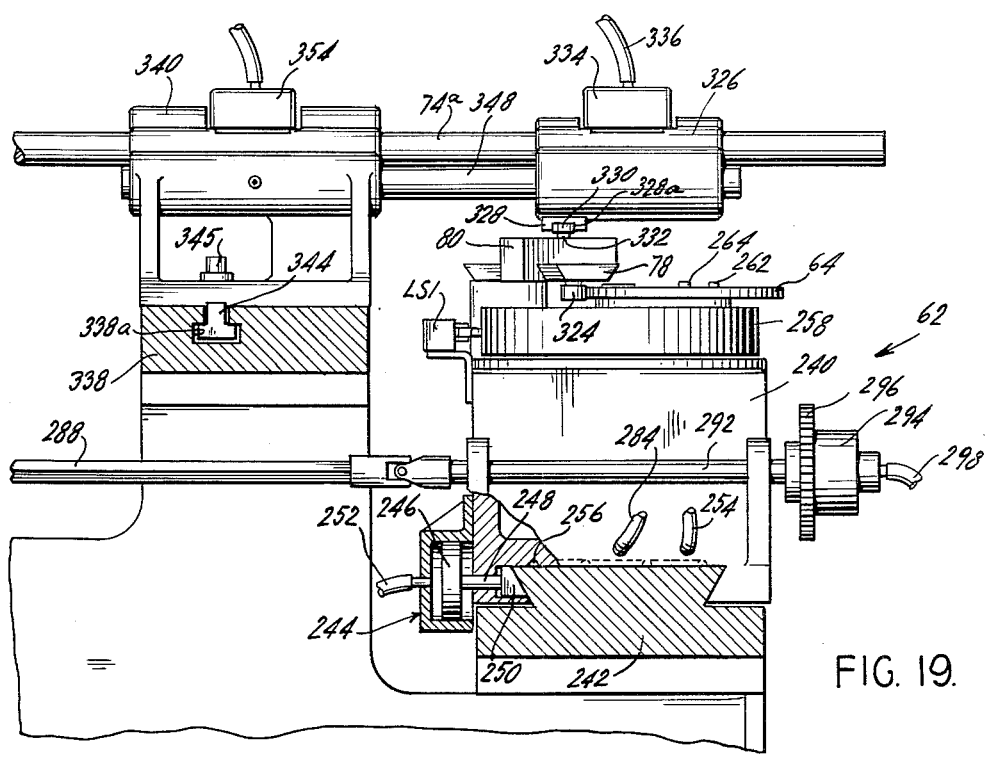
FIG. 19 is an elevational view taken substantially along the line 19—19 in FIG. 18 and looking in the direction of the arrows, with parts in section.

As seen best in FIG. 19, provision is made for clamping the generator housing 240 to the rail 242 in any adjusted position; and when not so clamped, to provide an air cushion between the generator housing 240 and the supporting rail 242 to enable the side to side adjustment of the generator housing 240 with minimum friction. Specifically, a cylinder housing 244 is mounted at the forward side of the generator housing 240 and carries a piston 246 which is coupled via piston rod 248 to a locking shoe 250 which is adapted to bear against the adjacent side of the dovetail rail 242 when air pressure is applied to the cylinder housing 244 via the air-inlet hose 252. At such times when the air is diverted from the cylinder housing 244 to release the pressure against the piston 246 and the corresponding locking contact between the shoe 250 and the rail 242, the air pressure is diverted via air-inlet hose 254 to a series of cutouts 256 formed in the underside of the generator housing 240 and providing an air cushion between the generator housing 240 and the supporting rail 242.

Disposed above the generator housing 240 is a generator turret 258 which carries any one of a number of curve standards 64 which are placed in the machine in accordance with the desired functional motion. Specifically, the generator turret 258 includes an upstanding mounting pin 260 and an aligning pin 262 which are received in corresponding holes in the curve standard 64 which is dropped over the pins and bolted to the generator turret 258 by one or more bolts 264. The axes of the pins 260, 262 are on a diameter with peripheral notches 258a, 258b formed in the generator turret 258 which are associated with a microswitch integrated into the control, as will be subsequently described. The function of the notches 258a, 258b is to halt rotation of the generator 62 after it has rotated through 180° and the machine 50 has completed a lobe cutting operation. The generator turret 258 has a depending central turret shaft 266 (see FIG. 20) which is journalled at its lower end by bearing 268 on the generator housing 240. Contiguous to the top of the generator housing 240 there is provided a further bearing 270 which is between the housing 240 and a depending clutch drum 272 integral with and depending from the generator turret 258.

The generator turret 258 is driven from a worm 274 which is journalled in the generator housing 240 and is driven from the turntable motor 228 as will be subsequently described. The worm 274 is in meshing engagement with a worm gear 276 which is journalled on a bearing sleeve 240a formed integrally with the generator housing 240 via bearings 278. The worm gear 276 is loosely journalled on the bearing sleeve 240a and is only coupled to the generator turret 258 when an internal pneumatic radial type clutch is engaged against the clutch drum 272. Specifically, the upper end of the worm gear 276 is formed with plural radially extending cylindrical guides which receive respective piston cups 280 which bear against associated clutch segments 282 which will be driven into contact with the inner peripheral surface of the clutch drum 272 upon application of air pressure to the inner side of the respective cups 280. Such air pressure is applied via an inlet hose 284 which is in communication with a radial bore 240b extending through the generator housing 240 and in communication with an axial bore 266a in the turret shaft 266 which is relieved away at 286 to define a manifold in communication with the respective ways for the piston cups 280. Appropriate pressure rings are provided about the shaft 266 to seal the respective air paths. Upon the application of air pressure to the respective cups 280, a driving connection is completed between the worm gear 276 and the clutch drum 272 to drive the generator turret 258 under control of motion imparted to the worm 274.

Figure 17:
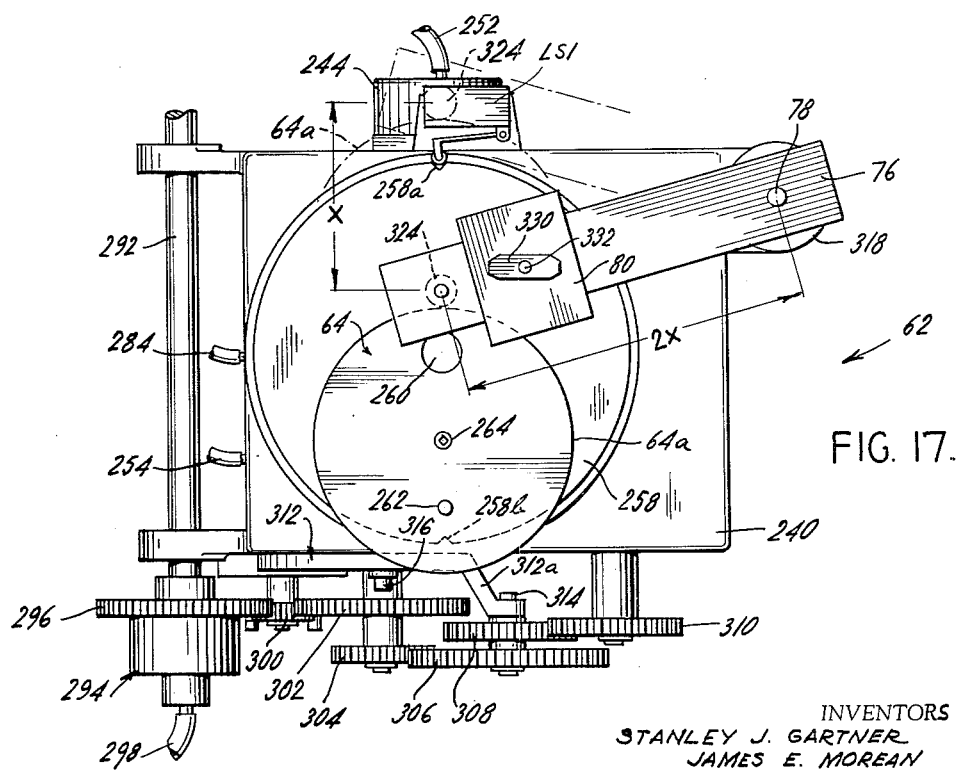
FIG. 17 is a plan view taken substantialy along the line 17—17 in FIG. 16 and looking in the direction of the arrows.
Figure 18:
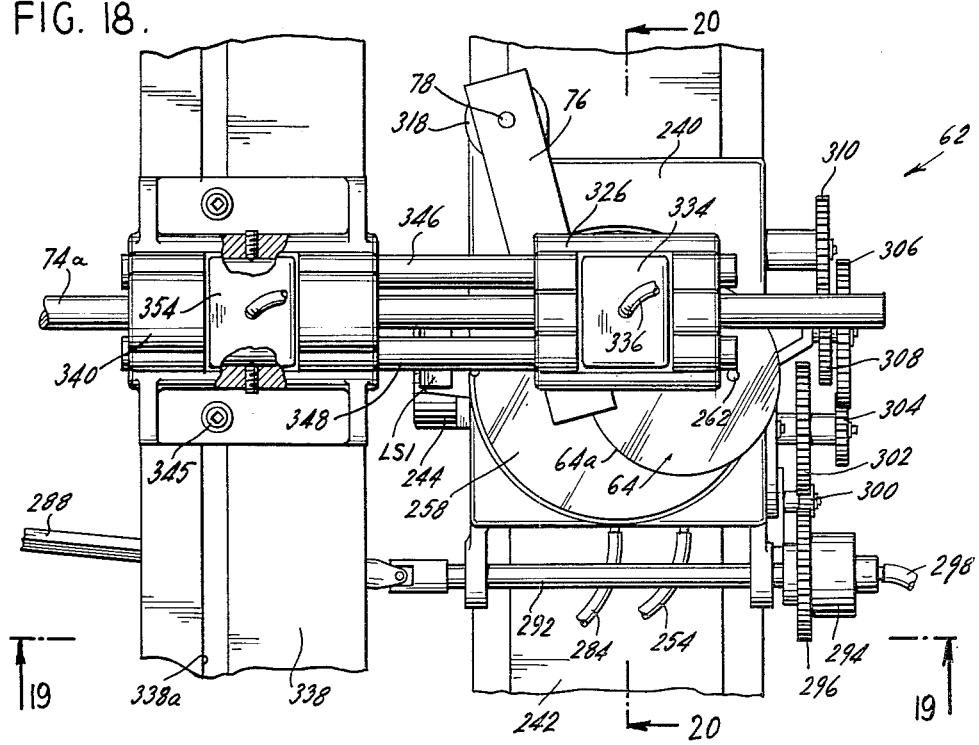
FIG. 18 is an enlarged fragmentary plan view, with parts broken away and sectioned, showing further details of the curve generator.

The worm 274 is driven from the turntable motor 228 by a telescoping shaft 288 which is connected at one end via constant velocity coupling 290 to the worm 226 (see FIGS. 13 and 14) and at its other end to a generator drive shaft 292 journalled on the generator housing 240, as seen best in FIGS. 17 to 19 inclusive. The drive shaft 292 carries a conventional air-operating clutch 294 which in turn carries a driven gear 296 which is coupled to the drive shaft 292 when air is introduced into the clutch 294 via the axial air inlet tube 298, as is generally understood. The gear 296 serves as the main or driving gear for a change gear train which includes gears 300, 302, 304, 306, 308 and 310 which have been numbered in the drawings to indicate their respective numbers of teeth for the particular cam to be generated in accordance with the illustrative embodiment of FIGS. 1 and 2. The change over for the gear train will be later described in connection with a typical sequence of operations. The output gear 310 of the change gear train is mounted directly on the end of the worm 274 which meshes with the worm gear 276 (see FIG. 20).

Figure 16:
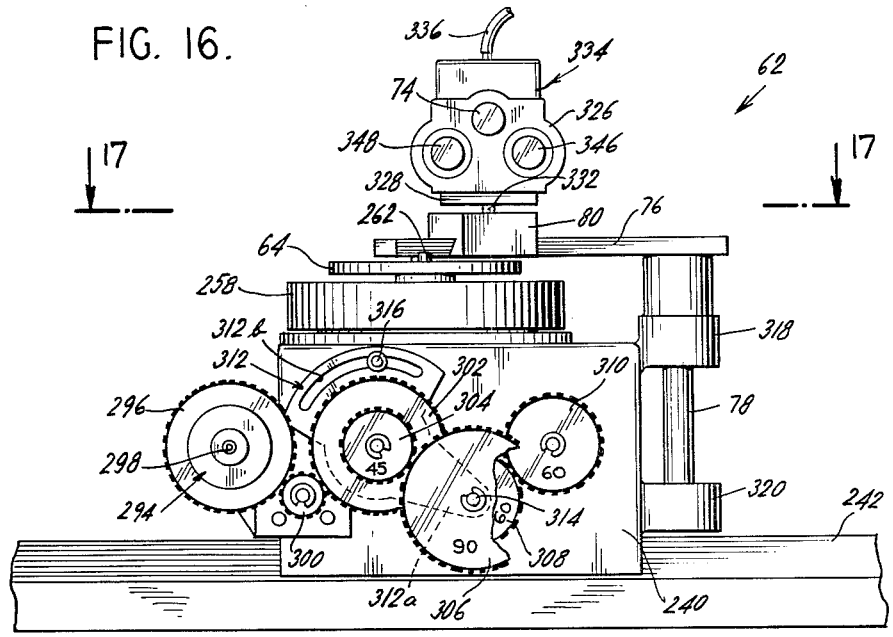
FIG. 16 is a fragmentary side elevational view of a curve generator embodied in the instant machine.

In changing over from the development of one type of cam lobe to another, it may be necessary to change one or more of the gears 304, 306, 308, and 310. Accordingly, provision is made to enable the re-establishment of the meshing relationship between the gears of the train for various gear sizes. To this end, and as seen in FIGS. 16 and 17, a gear-mounting plate 312 is rockably mounted coaxially of the gears 302, 304 and has a projecting arm 312a which carries the stub shaft 314 for the coaxial gears 306, 308. Provision is made for locking the gear-mounting plate 312 in any adjusted position by virtue of an arcuate slot 312b through which extends a locking bolt 316 which is tapped into the adjacent wall of the generator housing 240.

As previously explained, the curve generator 62 includes a generator arm 76 which is pivoted at a vertical generator pivot shaft 78 which is seen to be journalled in bearings 318, 320 on the generator housing 240. The generator arm 76 carries the adjustable slide block 80 which is fixed in any adjusted position by a lock nut 322 (see FIG. 20). The generator arm 76 carries a generator follower or roller 324 which engages the peripheral track 64a of the curve standard 64, with the generator roller 324 initially being disposed in alignment with the notches 258a, 258b and the pins 260, 262 and coming to rest at either the low or high point of the curve standard 64, depending upon whether or not a rise or a fall is to be cut during the next lobe-cutting interval requiring operation of the curve generator 62.

The slide block 80 on the generator arm 76 is coupled by a pneumatic motion transfer mechanism to the tracer linkage, which has heretofore been generally designated by the reference numeral 74. Specifically, a motion transfer block 326 is disposed above the block 80 clamped to the generator arm 76 and carries at its underside a coupling plate 328 formed with an elongated slot 328a which is open ended and receives a motion transfer shoe 330 journalled on a pin 332 carried on the block 80 and disposed along a center line between the generator arm pivot 78 and the generator follower 324. The tracer linkage 74 includes a first link 74a which extends through the motion transfer block 326 (see FIGS. 18 through 20 inclusive), a second link 74b which is coupled to the slide block 72 on the tracer arm 68, and an intermediate or third link 74c which is pivotally connected to the adjacent ends of the links 74a, 74b to impart motion transfer from the generator arm 76 to the tracer arm 68, notwithstanding the fact that the link 74a is confined to linear reciprocation and the link 74b may have to be disposed at an angle to the link 74a. As seen best in FIG. 20, proviison is made for pneumatically clamping the link 74a of the tracer linkage 74 to the motion transfer block 326 at such times when the generated motion derived from the curve generator 62 is to be imparted to the work table 52. Specifically, a pneumatic motion transfer or lobe clamp, generally designated by the reference numeral 334, is mounted on the motion transfer block 326 and is formed with an internal piston bore 334a which receives a piston cup 334b (see FIG. 20). The pneumatic clamp 334 is completed by a flexible diaphragm 334c which bears against the link 74a of the tracer linkage 74, with a yieldable pad 334d and backing member 334e being disposed between the diaphragm 334c and the piston cup 334b such that, upon the application of air pressure into the piston bore 334a via the air inlet tube 336, the motion transfer block 326 is clamped to the link 74a of the tracer linkage 74. The described pneumatic clamp 334 with the flexible diaphragm 334c which embraces the tracer link 74a assures the positive connection of the motion transfer block 326 to the tracer linkage 74 with minimum play and or backlash.

Provision is made to support and guide the motion transfer block 326 and to effectively clamp the work table 52 in a given adjusted position when cutting a dwell. Specifically, and as seen best in FIGS. 18 and 19, there is provided a further supporting rail 338 which extends from side to side of the machine adjacent and parallel to the supporting rail 242 (see FIGS. 10, 18 and 19) upon which is adjustably mounted a pneumatic dwell clamp 340. The dwell clamp 354 includes a housing 340 which is secured to the rail 332 in an adjusted position by the T-shaped guide block 344 and locking nut 345 which rides along a T-shaped guideway 338a formed in the supporting rail 338. The clamp block 342 carries a pair of spaced parallel guide rods 346, 348 which are disposed at opposite sides of the tracer linkage 74a, with the guide rods 346, 348 extending through respective bushings 350, 352 in the motion transfer block 326 (see FIG. 20).

A pneumatic dwell clamp, generally designated by the reference numeral 354, is mounted on the clamp block 340 and is identical in construction to the pneumatic motion transfer or lobe clamp 334 associated with the motion transfer block 326. At such times as the curve generator 62 is not in operation for a cam-cutting interval, the pneumatic motion transfer clamp 334 is released to effectively decouple the link 74a of the tracer linkage 74 from the motion transfer block 326 and the pneumatic dwell clamp 354 is engaged to fix the tracer linkage 74a against movement and thereby lock the work table 52 in its corresponding adjusted position.

As previously explained, the tracer arm 68 is coupled to the tracer linkage 74 by an adjustable slide block 72. In the illustrative machine, the tracer arm 68 includes an upper tracer arm 68a which carries the adjustable slide block 72 and a lower tracer arm 68b which is coupled via the servo linkage 82 to the work table 52. Specifically, as best seen in FIG. 11, the tracer arm shaft 70 is journalled on an elongated mounted sleeve 356 by appropriate upper and lower bearings (not shown), with the bearing sleeve 356 being appropriately mounted on the machine frame 36. The slide block 72 on the upper tracer arm 68a is not coupled directly to the link 74b of the tracer linkage 74, but rather has a pivotal connection thereto to allow the link 74b to pivot relative to the block 72, with the latter in any given adjusted position along the upper tracer arm 68a. Specifically, and as seen in FIG. 10, the block 72 includes a coupling sleeve 72a which receives the link 74b and may be clamped thereto, with the coupling sleeve 72a being pivoted on a pin 72b journaled on appropriate bearings carried on the block proper.

The forces available at the tracer arm 68, and particular at the lower tracer arm 68b are not of a magnitude sufficient to rock the work table 52 about the work table pivot 54. Accordingly the control motions available at the tracer arm 68 must be translated into working motions of a sufficient magnitude to rock the relatively heavy work table 52 against the forces developed at the cutting tool 60. To this end, a hydraulic work pistoin and cylinder 358 of the double acting type (see FIGS. 22–23), is disposed within and extends generally longitudinally of the machine frame 86, with the rearmost end of the cylinder 358 being pivotally connected, on a vertical cylinder pivot 360, to an appropriate internal support on the machine frame 86. The piston rod 362 projects from the end of the cylinder 358 remote from the vertical pivot 360 and carries the usual internal piston 362a, shown diagrammatically in FIGS. 22 and 23. The piston rod 362 is coupled via a yoke 364 and coupling pin 366 to the depending bracket 172 mounted on the table body 154 (see FIG. 15). Pivotally suspended from the yoke 364 is a bracket 368 which carries a multiple-port valve 370 including valve spool 372 extending toward the rear of the machine and in position to be actuated by and in response to rocking movement of the tracer arm 68b. Motion transfer from the lower tracer arm 68b to the valve spool 372 is achieved via the coupling rod 82a which is pivotally and flexibly connected via leaf spring 82b to the lower tracer arm 68b. The coupling rod 82a is pivotally and flexible connected to a reciprocating plunger 82c slidably mounted on the bracket 368 via the leaf spring 82d. The flexible couplings 82b, 82d achieve motion transfer and allow for a degree of misalignment between the rockable tracer arm 68b and the axially reciprocable plunger 82c.

In order to maintain the valve-supporting bracket 368 in proper orientation relative to the lower tracer arm 68b, a stabilizing rod 82e is flexibly and pivotally coupled to the tracer arm 64d via leaf spring 82f and to the relative stationary supporting rod 82g via the leaf spring 82h. The elements 82e, f, g and h keep bracket 368 from turning about its pivot on the yoke 364 and bringing the spool 372 of the multiple-port valve 370 out of a position in alignment with the actuating plunger 82c.

Referring to the diagrammatic and schematic showing of FIGS. 22 and 23, it will be seen that the valve spool 372 is appropriately configured internally of the valve 370 to selectively port the double-acting piston and cylinder 358, with a spring 374 being provided within the valve 370 to normally bias the spool 372 against the actuating plungers 82c which provides the read-in to the valve from the curve generator 62. An oil inlet 376 is connected to the valve 372 and may be selectively ported via conduits 378, 380 to the opposite faces of the piston 362a, with return outlets 382, 384 being provided for returning the hydraulic medium to the reservoir 388 (see FIG. 10), as is generally understood. The multi-port valve 370 is shown in FIG. 22 in its neutral position, while in FIG. 23 it is shown shifted to the left with appropriate porting to establish hydraulic feed and return for one of the two work strokes, namely a stroke which tends to rock the work table 52 in the clockwise direction about the work table pivot 54 when viewed in plan (see FIG. 10). Conversely, shifting of the spool 372 toward the right from the neutral position shown in FIG. 22 will port the valve 370 to rock the work table 52 in the counterclockwise direction about the work table pivot 54 when viewed in plan (see FIG. 10).

As seen in FIG. 10, the servo pump motor 386 is mounted on top of the hydraulic fluid reservoir 388 and appropriately supported within the frame work of the machine on independent frame, with appropriate extensions from the servo inlet and outlets shown in FIGS. 22 and 23 to the reservoir 388 which contains a convention fluid pump (not shown) driven by the pump motor 386, as will be described in conjunction with the description of the control.

In order to automatically determine the completion of a dwell cutting sequence of the machine (the lobe cutting sequence is determined by the 180° rotation of the curve generator activating the limit switch LS1), the periphery of the turntable 56, at selected locations about the calibrated dial plate 222, is provided with groups of pin-receiving holes 390 which are angularly spaced at 1° increments in the typical machine. Respective groups of holes 390 receive pins 392 which may be adjusted in accordance with the desired angular location for the signaling of the beginning of a lobe. The contact of the actuator LS2a of the switch LS2 by a pin 392 will initiate a lobe cutting interval as will be explained in detail below.

Referring now to the schematic illustration of FIGS. 21a, 21b and 21c, a specific description will be made of the control incorporated in the cam cutting machine 50. The various components shown schematically in these figures have been labeled according to the following system such that the function of the various parts may be more easily understood upon study of the schematic diagram:

The symbol CR indicates a control relay and the corresponding symbol CR1 indicates the first contact arm of that control relay. The symbol PB indicates a push button. The symbol LS indicates a limit switch, i.e. switch activated by movement of one of the physical components of the machine 50. SS indicates selector switch. The graphical representations of each of these symbols is schematically illustrative of the physical device itself and, in the case of switches or contacts, the condition shown in the drawings demonstrates the normal condition for the switch e.g. opened or closed.

The controls for the cam cutting machine 50 may be set to operate in any one of three different modes. Specifically, a three-position mode selector switch SS is provided to selectively energize an automatic mode control relay 11CR to set up the circuit for automatic operation, an oscillatory mode control relay 10CR to set up the circuit for operation in the automatic mode or to assume a neutral position wherein the dwell and lobe operations of the machine 50 may be manually controlled. The actual functioning of the mode selector switch SS1 will be understood by considering the description of the particular control circuits. A setup selector switch SS3 is also provided within the electrical control system and functions to override the normal control circuitry in order to allow the machine operator to initially set the various design parameters into the machine. The specific functioning of this switch will also be best understood in light of the following description of the control circuit itself and a typical sequence of the operations of the machine.

Before making reference to the controls which govern the operation of the machine 50 during the cam cutting operations, reference will be made to the various switching functions employed prior to the commencement of actual cam cutting. The motor 142 which drives the cutting tool 60 is started by depressing the push button PB14 which energizes the cutting head motor control relay 12CR by completing a circuit between the 110 volt alternating current power lines X1 and X2. The relay 12CR has a holding contact 12CR4 which completes a holding circuit bypassing the start push button PB14. Operations of the cutting head motor are halted by depressing the push button PB16. Energization of relay 12CR is effective to close the contacts 12CR1, 2 and 3 to deliver power to the three-phase motor 142.

A cooling or cutting fluid is provided during the cutting operations of the machine 50 and is pumped to the work area by means of a coolant pump motor 394 which is controlled by a coolant pump motor control relay 13CR in a circuit similar to the circuit for the cutting head motor control relay 12CR. Specifically, relay 13CR is energized by depressing the push button PB18 and is de-energized by depressing a stop push button PB19 and a holding circuit is provided through contact 13CR4 of the relay 13CR. Energization of the control relay 13CR effectively closes the coolant pump motor switches 13CR1, 2 and 3.

The servo pump motor 386 is controlled by a similar circuit to the servo pump motor control relay 14CR which is energized by push button PB1 and de-energized by push button PB2. A holding circuit through the contact 14CR4 is effective to maintain the servo pump motor 386 in operating condition after the start push button is released. Energization of the relay 14CR effectively closes the relay contacts 14CR1, 2 and 3 to deliver three-phase, alternating current to the servo pump motor 386.

The operations of cutting head lift motor 124 were described above and are controlled through a circuit wherein depression the push button PB20 is effective to raise the cutting head and depression push button PB21 is effective to lower that device. As seen in the circuit push button PB20 is effective to energize the up relay 17CR through the limit switch LS3 and the normally closed contacts 19CR4 to energize the relay 17CR and close the relay contacts 17CR1, 2 and 3 to drive the motor 124 in a forward direction. When the push button PB21 is depressed, the down relay 19CR is energized through limit switch LS4 and contact 17CR4 to close the contacts 19CR1, 2 and 3 and open contact 19CR4 to drive the lift motor 124 in the reverse direction. The limit switches LS3 and LS4 are placed respectively at the top and bottom of the travel of the work head to interrupt the respective circuits when the limits of travel of the head are reached.

In order to insure that the cutting head remains immobile on the frame of the machine 50 after it has been set in the proper position by the various lead screws described above, there are provided two air clamps controlled by the solenoid valves SV1 and SV2. The solenoid valves are in turn energized respectively by selector switches SS4 and SS5. The solenoid valve SV1 is effective through appropriate mechanisms to clamp the cutting head preventing vertical movement thereof and the solenoid valve SV2 is effective, through similarly appropriate mechanisms, to prevent transverse movement of the cutting head.

The various circuits described above, as well as various other portions of the circuits may be provided with appropriate pilot lights to indicate the operating conditions of those circuits.

Description will now be made of the portions of the control circuit which deal directly with the operations of the cam cutting machine 50 with preliminary emphasis being placed on the manual operation of the control circuits. Reference will first be made to the circuit which governs the operations of the machine 50 doing the cutting of a dwell or constant radius curve on the cam blank CB. The dwell control relay 1CR is manually energized by push button PB3 and is manually de-energized by the push button PB4. A holding circuit for the relay 1CR includes the normally opened contact 1CR1 and is in series with the normally closed contact of the limit switch LS2 which, as described above, is located in engagement with the turntable 56. Upon engagement of the limit switch LS2 with one of the pins 392 on the work-receiving turntable 56, the switch will be opened and dwell control relay 1CR will be de-energized. The normally closed contact 2CR2, in series with the dwell control relay 1CR, is controlled by the lobe controlled relay 2CR such that the dwell control relay 1CR cannot be energized while the lobe control relay 2CR is energized. A similar contact 1CR2 of the dwell control relay 1CR appears in the lobe control circuit to operate in the reverse situation. The dwell clamp solenoid valve SV3 is normally opened such that the dwell clamp 354 is engaged unless the valve SV3 is energized. The valve SV3 may be energized from the direct current lines K, L either through the setup switch SS3, which will be described below, or through the contact 7CR1. This contact is controlled by the clutch and clamp control relay 7CR which is energized only when the lobe control circuit is energized. As stated, the lobe control circuit cannot be energized during the dwell cutting operations because the contact 1CR2 in the lobe circuit is opened. Thus, the dwell clamp 354 is engaged during the dwell cutting operation.

Description will now be made of the lobe control circuit. The lobe control relay 2CR is manually energized by depressing push button PB5 which energizes the control relay 2CR through the normally closed contact 1CR2 of the dwell control relay 1CR and the generator clamp selector switch SS2, to be described more completely below. Energization of relay 2CR effectively closes its holding contact 2CR1 to provide a holding circuit for the relay 2CR through the contacts of the limit switch LS1 which are closed at all times except when the curved generator 62 is in its 180° positions as explained above. Thus, the lobe control relay 2CR may be de-energized either by the generator 62 reaching its 180° position or by depressing the stop button PB6 which is in series in the holding circuit. A time delay relay 8CR is parallel to the lobe control relay 2CR and its function will be described below. The lobe control relay 2CR controls, in addition to the holding contact 2CR1 and the contact 2CR2 within the dwell circuit, a contact 2CR3 within the turntable drive circuit parallel to contact 1CR3 to insure that the turntable 56 is driven only when one of the lobe and dwell control relays are energized, and a clutch and clamp control contact 2CR4 in series with the clutch and clamp control relay 7CR. Thus, when the lobe control relay 2CR is energized, the contact 2CR4 closes energizing the relay 7CR which closes the normally opened contact 7CR1 and energizes the solenoid valve SV3 thereby disengaging the dwell clamp 354. The relay 7CR also opens the normally closed contact 7CR2 to de-energize the normally opened lobe clamp solenoid valve SV5 thereby to engage the lobe clamp 334 in the manner described above. The relay 7CR further closes the contact 7CR3 to energize the solenoid valves SV6 and SV7 which respectively energize the main clutch 294 to the generator 62 and the internal generator clutch. Thus, upon activation of the lobe control relay 2CR, the dwell clamp 354 is released, the lobe clamp 334 is engaged and the main clutch 294 and generator clutch are engaged such that a lobe cutting operation, as described above, may be accomplished.

The turntable ready circuit, which must be energized before the cutting operations of the machine can begin includes a ready control relay 3CR which is energized by depressing stop button PB8 and is de-energized by stop button PB10. The circuit includes the contact 14CR5 which is normally opened and closes upon energization of the control relay 14CR in the servo pump motor control circuit to insure that the ready circuit is energized only if the servo mechanism circuit is in operation. It will be noted that the turntable ready control relay 3CR has a first contact 3CR1 which is used in the normal fashion as a holding contact. The second contact 3CR2 of the ready circuit control relay 3CR is located in series within the turntable direction control circuit such that the turntable motor 228 may be energized only after the ready circuit is activated. The third contact 3CR3 controls the delivery of power to the turntable motor 228 as seen in FIG. 21C. Reference to that figure will show normal power circuitry employed for a direct current motor.

The turntable control circuit includes a pair of directions governing relays 5CR and 6CR which are selectively energized by the normally closed contact 4CR1 and the normally opened contact 4CR2 of the control relay 4CR. Contact 4CR1 is in series with control relay 5CR to drive the turntable in a clockwise direction when the relay 4CR is not energized and contact 4CR2 is in series with control relay 6CR to produce counter-clockwise rotation when relay 4CR is energized. Still further, the direction circuit for the turntable includes dwell contact 1CR3 and lobe contact 2CR3 in parallel to each other and in series to the rest of the circuit, such that one of those two contacts must be closed for the direction circuit to be operative. The control relay 5CR and 6CR respectively control the contacts 5CR1 and 5CR2 and 6CR1, 6CR2 (see FIG. 21C) which are connected to the armature 228a of the motor 228 to selectively produce either clockwise or counterclockwise rotation of the turntable 56. Specifically, when the turntable ready circuit causes contact 3CR2 to close, and when one of the dwell or lobe control relays 1CR or 2CR are activated such that one of the contacts 1CR3 or 2CR3 are closed, either control relay 5CR or 6CR will be energized depending upon the condition of the control relay 4CR. As illustrated in the schematic, relay 4CR is de-energized such that control relay 5CR will be energized to move the contacts 5CR1 and 5CR2 from the position shown in FIG. 21C to their opposite position thus driving the turntable control motor 228 in a clockwise direction. Upon energization of control relay 4CR, the contact 4CR1 will open and contact 4CR2 will close to energize control relay 6CR and de-energize control relay 5CR. The contacts 5CR1, 5CR2 will return to the position shown in FIG.

21C and the contact 6CR1 and 6CR2 will move to their opposite positions to reverse polarity in the armature 228a of the motor 228 to drive the same in a counterclockwise direction. As seen, when neither relay 5CR or 6CR is energized, e.g. when contact 3CR2 is open or when both contacts 1CR3 and 2CR3 are open, the armature 228a of the motor 228 is hooked across a loading resistor 395 to give the motor 228 dynamic breaking.

The control relay 4CR which, as described immediately above, controls relays 5CR and 6CR to govern the direction of travel of the turntable, is in turn controlled by a contact 9CR1 of the direct current pulsing relay 9CR. This control relay, and its associated contact 9CR1, are operative only during the oscillating mode of operation of the machine 50, i.e., when the mode switch SS1 closes neither contacts A1 nor A2. Therefore, during either the manual or automatic modes, the relay 4CR is not energized and the clockwise control relay 5CR is energized thereby closing switches 5CR1 and 5CR to cause the motor 228 to rotate the turntable 56 in a clockwise direction. On the other hand, during the oscillatory mode of the machine 50, i.e. when the selector switch SS1 is set to bridge contacts A1 and the oscillation mode relay 10CR is energized, each time the limit switch LS2 is contacted by a pin 392, the ratchet pulse relay 9CR will be pulsed to alternatively open or close the contact 9CR1 thereby to energize or de-energize the relay 4CR. This in turn will produce a corresponding shift from clockwise to counterclockwise rotation of the turntable through the control relays 5CR and 6CR. Specifically, as may be seen in the upper lefthand portion of FIG. 21a, in the turntable reversing circuit portion of the control system, the ratchet pulse relay 9CR is energized from a DC rectifier source 396 through the normally closed contact 18CR1 of a pulse reversing relay 18CR. The pulse reversing relay 18CR is similarly connected to the D.C. source 396 through the normally opened parallel contacts 9CR2 of the relay 9CR and 18CR2 of the relay 18CR. It will be appreciated that one of the two contacts 9CR2, 18CR2 will be closed if either of the relay 19CR or 18CR are energized. Similarly, the contact 18CR1 will be closed only if the pulse reversing relay 18CR is de-energized since the ratchet pulse relay 9CR will change the position of its respective contacts at each current pulse to alternatively energize and de-energize contact relay 4CR each time the limit switch LS1 is activated or the push button PB11 is pressed. Although the lobe holding circuit is controlled by limit switch LS1 which would normally de-energize the circuit at the completion of a lobe-cutting operation, when the machine is in the oscillatory mode, the rotation of the turntable is reversed by LS2 before LS2 interrupts the lobe circuit. Specifically, the operating differential of LS2 is extremely small. On the other hand, limit switch LS2 has a large differential and is activated by the pins 392 prior to the arm LS1A engaging the generator notches 258a or 258b.

The setup switch SS3 is utilized to selectively set up the circuitry in the control system either for setting up the machine or for operations in the machine. Specifically, as shown in the drawings, the setup switch is illustrated in its running position wherein the first contacts A1 are closed to complete the circuit in the turntable ready circuit thereby to enable energization of the turntable ready control relay 3CR. An all-stop push button PB12 is in series with the first contact of the setup switch SS3 to serve as an emergency stop for the machine 50. A safety air-pressure switch 398 is also included in that series circuit to insure that operations will commence only when there is adequate air-pressure for the various clamps. When the setup switch SS3 is in its setup state, i.e. is bridging the contacts A2, the dwell clamp valve SV3 will be energized to deactivate the dwell clamp 354.

The mode switch SS1 is a three-position switch. Specifically when the switch is set to close the contacts A1, the circuit is set up for the oscillatory mode, when the switch is set up in the intermediate position as shown, the circuit is set up for manual operations and when the mode switch SS1 is set up to close the contacts A2, the circuit is set for the automatic operation of the machine 50. Specifically, in the automatic mode the mode switch SS1 effectively energizes the oscillatory mode relay 10CR to activate the various contacts 10CR1, 10CR2, 10CR3 and 10CR4 to operate as described. In the automatic mode, the mode switch SS1 energizes the automatic mode relay 11CR to actuate the various contacts 11CR1, 11CR2, 11CR3 and 11CR4 which function in the manner to be described below.

The automatic operation of the cam cutting machine 50 is controlled by a programmer which will now be described with reference to FIG. 21B. The programmer, generally designated by the numeral 400, comprises a series of mechanically linked selector switches 400A and 400B (only one of which is labeled) which switches may be set at either contact A1 and B1, A2 and B2 or A3 and B3 to respectively select a dwell signal, a pass signal to the next switch, or a lobe signal. In the programmer illustrated in the drawings, ten such selector switches 400A, 400B are illustrated, however, a lesser or greater number of such switches may be employed. It should be understood that the circuitry employed automatically jumps to the next successive selector switch to determine the operations of the machine 50 after the completion of each successive programmed operation. The particular switch which will signal operations of the machine 50 is selected by the stepping relay 16CR and its associated wiper arms 16CR4 which successively connects the contact 400A of the various switches to the alternating current power line XI. As illustrated in the first selector switch in FIG. 21B, upon a pulse of the wiper arm 16CR4 of the stepping relay 10CR the dwell control relay 1CR will be energized through the electrical connection at F. Similarly, when the wiper arm 16CR4 is moved to its second contact, the second switch, set at contact A3, will energize the lobe control relay 2CR through the connection at G. The third position for the switches 400A, 400B is shown in FIG. 21B in the fifth switch of the programmer 400, where the contacts are connected respectively in their A2 and B2 positions. In this position the stepping relay 16CR will be automatically pulsed to move the stepping relay wiper arms 16CR4 and 16CR5 to their next positions thus enabling a programmer to skip over one or more of the selector switches 400A, 400B. A third wiper arm 16CR6 of the stepping relay 16CR is connected in a separate pilot light circuit through an appropriate transformer to light a series of pilot lights indicating which of the 10 switches is in operation at any one moment.

The circuitry of the stepping relay 16CR will be activated when the control circuit is set up for the automatic mode by the closing of the normally opened contact of limit switch LS2 by engagement with a pin 392. This will close the circuit through contact 11CR3 (point H in FIGS. 21A and 21B) to energize the primary of the transformer T3. The secondary of the transformer T3 has a diode D5 in series therewith to produce the necessary direct current for the stepping relay 16CR. Automatic operations are commenced by pressing the start push button PB22 to pulse the relay 16CR and to step the wiping contacts 16CR4, 5 and 6 into their first positions. The machine will then operate as programmed. Presuming that the first operation is a dwell, the limit switch LS2, when contacting the next pin 392 will mark the end of the dwell operation completing the circuit to the stepping relay 16CR to cause the wiper arms 16CR4, 5 and 6 to move to their next successive positions. Presuming that a lobe is programmed on this next position, the lobe circuit is actuated. Since the lobe operation is determined by the limit switch LS1 rather than the limit switch LS2, it is desirable to have limit switch LS1 pulse the stepping relay 16CR rather than the limit switch LS2 to avoid any possibilities of lack of exact coordination. In order to do this, a lobe relay operated contact 2CR5, normally closed, is positioned in series with the normally opened contact of limit switch LS2 thereby opening that circuit when the lobe control relay 2CR is energized. The time-delay relay 8CR, which is in parallel with the lobe control relay 2CR, opens its associated contact 8CR1 in series with the limit switch LS1 after a slight delay after de-energization of the relay 2CR thus enabling the limit switch LS1 to assume its condition as shown in the drawings and to send a signal by-passing the limit switch LS2 to the stepping relay circuit to cause the stepping relay 16CR to go to its next programmed position. Now presuming that the next switch is set up at contacts A2 and B2, it will be seen that contact B2 is connected through the wiper arm 16CR5 directly to the stepping relay which produces an automatic self-stepping 16CR1 to immediately move to the next successive switch 400A, 400B within the programmer 400.

Incorporated within the stepping relay circuit for the stepping relay 16CR is a program clear switch SS6 which forms a self-interrupting circuit. Specifically when the selector switch SS6 is depressed and its contacts A2 are closed, current is delivered to the stepping relay 16 causing it to return to its home position thus clearing the programmer 400. The second contact of the selector switch SS2 will bridge contact 82 when the switch is depressed and provide the necessary direct current to perform this clearing operation. The third contact of selector switch SS6 (see FIG. 21B at F) is normally connected in series in the connection of the contacts A1 of the various programmer selector switches to the dwell circuit and that circuit is interrupted when the selector switch SS6 is activated to clear the program thus interrupting any dwell-cutting operations of the machine 50. It should be noted that if the program clear switch is operated during a lobe operation, the programmer will clear, but the lobe operation will continue until terminated by the limit switch LS1 as described above. The contact 16CR2 does not open until the wiper arms of 16CR have reached their home positions.

It is believed that the foregoing detailed description of the machine 50 and its control circuitry will be best understood by considering the process for setting up the machine for a typical automatic operation and considering a description of the performance of the machine through that automatic operation. Therefore, the following description is presented to enable a more complete understanding of the invention.

The cam generating machine 50 is set up to automatically cut a cam according to the following detailed procedure. This description concerns the setup specifically for the production of cam 30 illustrated in FIG. 2, however, it should be understood that an infinite variety of other cams may be produced by similar procedures. For ease of understanding, the setup steps are limited in sequence:

(1) The position of the cutter tool 60 is adjusted with respect to the work-supporting turntable 56 by making the distance B of FIG. 5 between the cutter tool 60 and the work table pivot 54 equal to the distance B of FIG. 1 which represents the length of follower arm 36b of rocker arm 36. The cutting head is then clamped in position by such means as the set switches SS4 and SS5 activating the clamping solenoid valves SV1 and SV2.

(2) The setup switch SS3 is turned to its set position engaging contact A2 and B2.

(3) The slide block 72 is then adjusted along the tracer arm 68 to make the dimension A of FIG. 5 equal to the dimension A of FIG. 1 between the rocker arm pivot 38 and the work point 40 and clamp the slide block 72 in position.

(4) The angle G between the tracer arm 78 and the tracer link 74 is set to be equal to the angle G in FIG. 2 between the center line of the rocker arm 36 and the coupling rod 42 and clamp the block 72 to the tracer link 74.

(5) The setup switch SS3 is set to its run position with contacts A1 closed.

(6) The generator clamp switch is then moved to its off position interrupting the lobe circuit and energizing the generator clamp valve SV4.

(7) The tracer linkage 74 is then aligned with slide block 72.

(8) The slide block 80 is adjusted along the generator arm 76 to set the dimension between the slide block 80 and the generator arm pivot 78 equal to twice the length (2E) of the dimension E in FIG. 1 which is the maximum linear movement of the work point 40. The block 80 is then fixed on the generator arm 76 by the lock nut 322.

(9) The curve standard 64 is then located on the curve generator 62 in the high dwell position as illustrated in FIG. 5.

(10) The motion transfer shoe 330 is then engaged in the coupling plate 328 of the motion transfer block 326.

(11) The generator clamp switch SS2 is then switched to its on position across contacts A2 de-energizing the generator clamp valve SV4, i.e. engaging the generator clamp, and enabling the lobe circuit to be energized when desired.

(12) The generator gear train is then set up for the particular cam arrangement, in the present case, the gearing is set up to produce a 180° turn of the generator 62 in response to a 60° rotation of the work-supporting turntable 56.

(13) The switches 400A, 400B and the programmer 400 are then set for the sequence of operations to be performed for the manufacture of the particular cam. In the illustrative case, the first switch is set in its lobe position, i.e. at contacts A1, B1; the second switch is set in the dwell position, i.e. at contacts A3, B3; the third switch is set in the lobe position; and, the fourth switch is set in the dwell position.

(14) The work-supporting turntable 56 is adjusted along the keyway 186 of the work table 52 to set the dimension C between the center of the turntable 58 and the pivot point 54 of the work table 52, to be equal to the dimension C of FIG. 1 between the center of the cam 30 and the pivot point 38 of the rocker arm 36.

(15) The dimension D between the cutter tool 60 and the center 58 of the work-supporting turntable 56 is then set to correspond to the dimension D of FIG. 1 between the center of the cam 30 and the center of the follower 34 by pivoting the work table 52 about the work table pivot 54.

(16) The drive shaft 288 for the work-supporting turntable 56 and the generator 62 is then aligned between those two elements by swinging the housing 198 about the pivot 190 while allowing for the approximate swing of the work table 52 during the cutting of the cam.

(17) The location of the work-supporting turntable 56 on the work table 52 is then fixed by setting the clamps 236, 238.

(18) The piston rod 362 is then fixed to the work table 52 by tightening the clamping shaft 184.

(19) The keyway of the cam blank CB is then located in alignment with the keyway in the arbor 210 and the cam blank CB is then rigidly held down by the clamping screw 216.

(20) The work-receiving turntable 56 is then rotated to align the keyway of the cam blank CB 180° from the center line of the cutter tool 60.

(21) A limit switch actuating pin 392 is then inserted within the hole 390 on the dial plate 222 in exact alignment with the limit switch LS2 such that the switch is actuated.

(22) Three further actuating pins 392 are located at 60° intervals of the first actuating pin 392 to demark the points at which the machine is to change from one cutting operation to another.

(23) A cutter tool 60, one-sixteenth of an inch smaller in diameter than the diameter F of the follower 34, is then inserted into the chuck of the cutter assembly 126.

(24) The cutting head motor 124 is then activated by pressing start button PB14.

(25) The coolant pump motor 394 is then activated by depressing the push button PB18.

(26) The cutting head 126 is then lowered into engagement with the cam blank CB by the lead screws 106, 108 as operated by the motor 124 and controlled by the cutting head control button PB20 and PB21, final engagement being made by hand wheel 122.

(27) The programmer is set to its initial position by depressing the selector switch SS6.

(28) The mode selector switch SS1 is then set in the automatic position to energize the automatic motor relay 11CR.

(29) The rotary turntable controls are then set to drive the turntable 56 in a clockwise direction.

(30) The turntable ready circuit is activated by depressing the push button PB8 to energize the ready control relay 3CR.

(31) The automatic program start button PB22 is then depressed to send a first pulse of current to the stepping relay 16CR to commence cutting operations in accordance with the pre-set program in the programmer 400.

(32) The cam cutting machine 50 then enters its automatic operation which, according to the specific example illustrated herein, proceeds as follows:

The programmer as illustrated, completes the lobe circuit to energize the lobe control relay 2CR. The turntable rotation control circuit is then closed by the closing of the contact 2CR3 which energizes the clockwise control relay 5CR to close the switches 5CR1 and 5CR2 to the turntable motor 228. The clutch and clamp control relay 7CR is energized to close the main clutch and the generator clutch and to engage the lobe clamp 334 and to disengage the dwell clamp 354. As the cam blank CB is rotated through 60°, the curve generator 62 rotates through 180° to cut the first lobe. At the end of this cut, the limit switch LS1 is then opened to de-energize the lobe control relay 2CR and the time delay relay 8CR thereby disengaging the main and generator clutches and reversing the conditions of the lobe and dwell clamps. The work-receiving turntable continues to rotate such that a 60° dwell is cut as governed by the second switch in the programmer 400 which is set to complete the dwell circuit and to energize the dwell control relay 1CR. At the end of the 60° dwell cut, the appropriate actuating pins 392 opens the limit switch LS2 de-energizing the dwell control relay 1CR to once again engage the main clutch 294 and the generator clutch, to engage the lobe clamp 334 and disengage the dwell clamp 354 as the programmer 400 is stepped to the third switch which is set to complete the lobe circuit and energize the lobe control relay 2CR. The work-receiving turntable 56 continues to rotate to cut a 60° rise during which time the curve generator 62 rotates through 180°. At the end of that rotation the limit switch LS1 is again actuated to switch operations as recited above from a lobe cutting to a dwell cutting condition. The cam cutting machine will then continue through a 180° dwell cut until the pin 392 located at the 0°–360° position on the work-supporting turntable 56 engages the limit switch LS2. This will complete the circuit to the stepping relay 16CR to advance the programmer 400 to the next switch. Since all subsequent switches are set in the pass position, the wiper arm 16CR4 will automatically step the stepping relay and the associated wiper arms to their home positions completing the operations of the machine 50.

(33) The cutting head assembly 126 is then raised and the undersized cutter is replaced with a cutting tool 60 which is equal in diameter to the follower 34 which will be actually used in association with the particular cam being cut.

(34) The cutting tool 60 is then lowered to the required depth to cut the finished cam.

(35) The automatic operations of the machine as stated in Nos. 31 and 32 above are then repeated to cut the finished cam 30.

(36) The finished cam 30 is then removed from the arbor of the machine 50.

Although the foregoing description of the operation of the cam cutting machine 50 uses an example the cutting of a relatively simple cam, it should be appreciated that large varieties of cams having both simple and complex work functions may be cut on an automatic, semi-automatic or manual controlled basis. It should be appreciated that even in the manufacture of a cam as simple as the illustrative cam 30, considerable time is saved in engineering design of the cam since the constructions of the machine 50 enable the cam to be made directly from the desired output characteristics of the cam with automatic compensation being made for the cam follower linkage. Further design time is saved in that the specific development of the cam does not have to be engineered. Furthermore, machining time is saved in that there is no preliminary template or master which has to be plunge cut on a milling machine and hand filed in the customary manner. In short, it should be appreciated that the present invention, even on most simple cams of the type illustrated, makes substantial savings in both engineering and manufacturing time and expense. With respect to more complicated cams, still greater savings of engineering and machining time may be accomplished since the machine according to the present invention requires only that the desired outputs of the actual follower linkage be determined as a function of the rotation of the cam since the machine incorporates an analog of the cam follower linkage. With proper setup procedures for the machine, a virtual infinite number of accurate cam shapes may be developed.

Although the foregoing disclosure presents one presently preferred embodiment of the invention and illustrates an example of a manufacturing process, a variety of design changes may be easily made in the physical embodiment of the machine shown and similar variations may be made in the described process without departing from the basic teachings of the invention. Therefore, the following claims should be construed broadly in a manner consistent with the spirit and scope of the present invention.

What we claim is:

1. A machine for automatically developing and cutting a cam of the type which is rotated on a cam shaft and which moves a follower and motion transmitting means in a prescribed motion as said cam is rotated comprising a work table mounted for rocking movement about a work table pivot, a rotary work-supporting turntable including means to secure a cam blank thereto, means mounting said work-supporting turntable on said work table for rotary movement about a turntable pivot, a cutter head including a cutter tool adapted to rotate about a cutter axis oriented parallel to the axis of said turntable pivot and engageable with said cam blank, means for rotating said work-supporting turntable at a cam-cutting speed, an analog system corresponding to said cam follower and motion transmitting means and operatively engaged with said work table, and motion producing means engaged with said analog system and engaged with said turntable rotating means for simultaneously rocking said work table about said work table pivot in timed relation to the rotation of said work-supporting turntable and in an amount and at a rate related to the motion to be produced at said follower.

2. A machine for cutting a cam for use in a working environment which includes follower and motion transmitting means comprising a work-supporting turntable rotatable about a turntable axis and having engagement means to secure a cam blank to said turntable coaxially thereof for rotation about the cam blank axis, a cutting tool oriented parallel to said turntable axis, means mounting said turntable and said cutting tool for controlled relative displacement therebetween, an analog linkage system corresponding to said follower and motion transmitting means, motion-producing means operatively engaged with said analog linkage system for introducing a control motion related to the output motion to be produced by the cut cam and said follower and motion transmitting means, means operatively connecting said analog linkage system to one of said turntable and said cutting tool for producing displacement therebetween as said cam blank is rotated about said cam blank axis, means coordinating the rotation of said turntable and the operation of said motion-producing means, drive means for said turntable, and drive means for said cutting tool.

3. A machine for cutting a cam for use in a working environment which includes follower and motion transmitting means comprising a work-supporting turntable rotatable about a turntable axis and having engagement means to secure a cam blank to said turntable coaxially thereof for rotation about the cam blank axis, a cutting tool oriented parallel to said turntable axis, means mounting said turntable and said cutting tool for controlled relative displacement therebetween, an analog linkage system corresponding to said follower and motion transmitting means, a curve generator operatively engaged with said analog linkage system for introducing a control motion related to the output motion to be produced by the cut cam and said follower and motion transmitting means, means operatively connecting said analog linkage system to one of said turntable and said cutting tool for producing displacement therebetween as said cam blank is rotated about said cam blank axis, means coordinating the rotation of said turntable and the operation of said curve generator, drive means for said turntable, and drive means for said cutting tool.

4. A machine for cutting a cam for use in a working environment which includes follower and motion transmitting means comprising a work-supporting turntable rotatable about a turntable axis and having engagement means to secure a cam blank to said turntable coaxially thereof for rotation about the cam blank axis, a cutting tool oriented parallel to said turntable axis, means mounting said turntable and said cutting tool for controlled relative displacement therebetween, an analog linkage system corresponding to said follower and motion transmitting means, a curve generator operatively engaged with said analog linkage system for introducing a control motion related to the output motion to be produced by the cut cam and said follower and motion transmitting means, means including a mechanical servo mechanism operatively connecting said analog linkage system to one of said turntable and said cutting tool for producing displacement therebetween as said cam blank is rotated about said cam blank axis, means coordinating the rotation of said turntable and the operation of said curve generator, drive means for said turntable, and drive means for said cutting tool.

5. A machine for cutting a cam for use in a working environment which includes follower and motion transmitting means comprising a work-supporting turntable rotatable about a turntable axis and having engagement means to secure a cam blank to said turntable coaxially thereof for rotation about the cam blank axis, a cutting tool mounted for rotation about a cutting tool axis and oriented parallel to said turntable axis, means mounting said turntable for relative displacement with respect to said cutting tool axis, an analog linkage system corresponding to said follower and motion transmitting means, a curve generator operatively engaged with said analog linkage system for introducing a control motion related to the output motion to be produced by the cut cam and said follower and motion transmitting means, means operatively connecting said analog linkage system to said turntable mounting means for causing displacement thereof as said cam blank is rotated about said cam blank axis, means coordinating the rotation of said turntable and the operation of said curve generator, drive means for said turntable, and drive means for said cutting tool.

6. A machine for cutting a cam for use in a working environment which includes follower and motion transmitting means comprising a work-supporting turntable rotatable about a turntable axis and having engagement means to secure a cam blank to said turntable coaxially thereof for rotation about the cam blank axis, a cutting tool mounted for rotation about a cutting tool axis and oriented parallel to said turntable axis, means mounting said turntable for relative displacement with respect to said cutting tool axis, an analog linkage system corresponding to said follower and motion transmitting means, a curve generator operatively engaged with said analog linkage system for introducing a control motion related to the output motion to be produced by the cut cam and said follower and motion transmitting means, said curve generator including a housing, a generator turret, bearing means mounting said generator turret in said housing for rotation about its axis, a curve standard having a peripheral curve track, means for removably mounting said curve standard on said generator turret for rotation therewith, rotary motion input means operatively interconnecting said generator turret and said turntable for rotating said generator turret in timed relation to the rotation of said turntable, a generator output follower, means mounting said generator follower in engagement with said peripheral curve track for moving said output follower with respect to said generator turret axis at a controlled rate governed by the shape of said curve standard and the speed of rotation of said turntable, means operatively connecting said analog linkage system to said turntable mounting means for causing displacement thereof as said cam blank is rotated about said cam blank axis, said rotary motion input means coordinating the rotation of said turntable and the operation of said curve generator, drive means for said turntable, and drive means for said cutting tool.

7. A machine for automatically developing and cutting a radial cam which is engaged by a cam follower mounted on a double-arm lever having a lever pivot spaced from said cam pivot and including rocker and follower arms, said machine comprising a work table, means mounting said work table for rocking movement about a work table pivot, a rotary work-supporting turntable adapted to support a cam blank, means rotatably mounting said work-supporting turntable on said work table for rotary movement about a turntable pivot, a cutter head including a cutter tool adapted to rotate about a cutter axis, means mounting said cutter head for movement toward and away from said turntable pivot to bring said cutter tool into and out of engagement with said cam blank, drive means for rotating said work-supporting turntable, means for rocking said work table about said work table pivot, and a curve generator in operative engagement with said rocking means for rocking said work table about said work table pivot in timed relation to the rotation of said work-supporting turntable for selectively varying the radial dimension of a cam cut on said machine.

8. A machine for automatically developing and cutting a radial cam, said machine comprising a work table mounted for rocking movement about a work table pivot, a rotary work-supporting turntable adapted to support a cam blank mounted on said work table for rotary movement about a turntable pivot, a cutter head including a cutter tool adapted to rotate about a cutter axis, means mounting said cutter head for movement toward and away from said turntable pivot to bring said cutter tool into and out of engagement with said cam blank, and a curve generator in operative engagement with said work table for rocking said work table about said work table pivot to vary the distance between said turntable pivot and said cutter axis in timed relation to the rotation of said work-supporting turntable for selectively varying the radial dimension of a cam cut on said machine.

9. A machine for automatically developing and cutting a radial cam comprising a rotary work-supporting turntable adapted to support a cam blank, means rotatably mounting said work-supporting turntable for rotary movement about a turntable pivot, a cutter head including a cutter tool adapted to rotate about a cutter axis oriented parallel to the axis of said turntable pivot, means mounting said work-supporting turntable and said cutter head for relative movement therebetween with said cutter tool engaged with said cam blank for varying the radius of a cam being cut from said cam blank, drive means for rotating said work-supporting turntable, means for varying the distance between said turntable pivot and said cutter axis, and a curve generator in operative engagement with said distance varying means for varying said distance in timed relation to the rotation of said work-supporting turntable to selectively vary the radial dimension of a cam cut on said machine.

10. A machine for automatically developing and cutting a radial cam comprising a work table, means mounting said work table for rocking movement about a work table pivot, a rotary work-supporting turntable adapted to support a cam blank, means rotatably mounting said work-supporting turntable on said work table for rotary movement about a turntable pivot, a cutter head including a cutter tool adapted to rotate about a cutter axis, means mounting said cutter head for movement toward and away from said turntable pivot to bring said cutter tool into and out of engagement with said cam blank, means for imparting rotary movement to said work-supporting turntable, means for rocking said work table about said work table pivot, and a curve generator in operative engagement with said rocking means for rocking said work table about said work table pivot in timed relation to the rotation of said work-supporting turntable for selectively varying the radial dimension of a cam cut on said machine, said curve generator comprising a generator turret, bearing means mounting said generator turret for rotation about its axis, a curve standard having a peripheral curve track, means for removably mounting said curve standard on said generator turret for rotation therewith, rotary motion input means engaged with said generator turret for rotating said generator turret in timed relation to the rotation of said work-supporting turntable, a generator output follower, means mounting said generator output follower in engagement with said peripheral curve track for moving said output follower with respect to said generator turret axis at a controlled rate governed by the shape of said curve standard and the speed of the rotary input, and linkage means interconnecting said generator output follower with said rocking means.

11. A machine for cutting a cam for use in a working environment which includes follower and motion transmitting means having an output motion point at which output motion is produced along an output motion path, said machine comprising a work-supporting turntable rotatable about a turntable axis and having engagement means to secure a cam blank to said turntable coaxially thereof for rotation about the turntable axis, a cutting tool oriented parallel to said turntable axis, means mounting said turntable and said cutting tool for relative displacement, an analog linkage system corresponding to said follower and motion transmitting means, means operatively connecting said analog linkage system to said turntable for causing displacement thereof as said cam blank is rotated about said turntable axis, actuating means for applying a control motion to said analog linkage system for actuating said analog linkage system in timed relation to rotation of said turntable, drive means for said turntable, and drive means for said cutting tool.

12. A machine for cutting a cam for use in a working environment which includes follower and motion transmitting means having an output motion point at which output motion is produced along an output motion path, said machine comprising a work table mounted for rocking movement about a work table pivot, a work-supporting turntable mounted on said work table and rotatable about a turntable axis, engagement means on said turntable to secure a cam blank coaxially thereto for rotation about about said turntable axis, a cutting tool oriented parallel to said turntable axis, an analog linkage system corresponding to said follower and motion transmitting means, means operatively connecting said analog linkage system to said work table for causing displacement between said turntable axis and said cutting tool as said cam blank is rotated about said turntable axis, actuating means for applying a control motion to said analog linkage system for actuating said analog linkage system in timed relation to rotation of said turntable, drive means for said turntable, and drive means for said cutting tool.

13. A machine for cutting a cam for use in a working environment which includes follower and motion transmitting means having an output motion point at which output motion is produced along an output motion path, said machine comprising a work-supporting turntable rotatable about a turntable axis and having engagement means to secure a cam blank to said turntable coaxially thereof for rotation about said turntable axis, a cutting tool oriented parallel to said turntable axis, means mounting said turntable and said cutting tool for relative displacement, an analog linkage system corresponding to said follower and motion transmitting means, means including a servo mechanism operatively connecting said analog linkage system to said turntable for causing displacement thereof as said cam blank is rotated about said turntable axis, actuating means for applying a control motion to said analog linkage system for actuating said analog linkage system in timed relation to rotation of said turntable, drive means for said turntable, and drive means for said cutting tool.

14. A machine for cutting a cam for use in a working environment which includes follower and motion transmitting means having an output motion point at which output motion is produced along an output motion path, said machine comprising a work table mounted for rocking movement about a work table pivot, a work-supporting turntable mounted on said work table and rotatable about a turntable axis, engagement means on said turntable to secure a cam blank coaxially thereto for rotation about said turntable axis, a cutting tool oriented parallel to said turntable axis, an analog linkage system corresponding to said follower and motion transmitting means, means including a servo mechanism operatively connecting said analog linkage system to said work table for causing displacement between said turntable axis and said cutting tool as said cam blank is rotated about said cam blank axis, actuating means for applying a control motion to said analog linkage system for actuating said analog linkage system in timed relation to rotation of said turntable, drive means for said turntable, and drive means for said cutting tool.

15. In a cam-cutting machine having a cam-cutting tool, a rotary work-receiving turntable and means mounting said turntable and said cam-cutting tool for relative displacement therebetween, said machine being of the type used for cutting a radial cam adopted to be mounted on a cam shaft and used with motion transmission means including a follower and a double-armed lever mounted on a lever pivot and having a rocker arm and a follower arm on which is mounted said follower, said follower arm having an output point spaced from said lever pivot at which a functional output motion is produced along an output motion path as a function of the speed of rotation of said cam, the development of said cam and the geometry of said motion transmission means: an analog linkage corresponding to said motion transmission means and operatively connected to the means mounting said turntable, said analog linkage comprising a first link corresponding to said rocker arm, a second link corresponding to said follower arm, a third link corresponding to the distance between the axis of said cam and said lever pivot, a fourth link corresponding to the distance between the axis of said cam and the axis of said follower, and a fifth link of a length related to the total linear amplitude of said functional output motion, and motion-producing means operatively engaged with said analog linkage at a point corresponding to the output point of said motion transmission means for moving said analog linkage in relation to the rate of rotation of said turntable and in relation to the desired functional output motion for varying the radius of said cam being cut by said machine.

16. In a cam-cutting machine having a cam-cutting tool and a rotary work-receiving turntable and means mounting said turntable for displacement relative to said cam-cutting tool, said machine being of the type used for cutting a radial cam for use with motion transmission means including a follower and a double-armed lever mounted on a lever pivot and having a rocker arm and a follower arm on which is mounted said follower, said follower arm having an output point spaced from said lever pivot at which a functional output motion is produced along an output motion path as a function of the speed of rotation of said cam, the development of said cam and the geometry of said motion transmission means: an analog linkage corresponding to said motion transmission means and operatively connected to the means mounting said turntable, said analog linkage comprising a first link corresponding to said rocker arm, a second link corresponding to said follower arm, a third link corresponding to the distance between the axis of said cam and said lever pivot, a fourth link corresponding to the distance between the axis of said cam and the axis of the said follower, and a fifth link of a length related to the total linear amplitude of said functional output motion, said cam-cutting tool being of a diameter equal to the diameter of said follower, and motion-producing means operatively engaged with said analog linkage at a point corresponding to the output point of said motion transmission means for moving same in relation to the rate of rotation of said turntable and in relation to the desired functional output motion for varying the radius of said cam being cut by said machine.

17. In a cam-cutting machine having a cam-cutting tool and a rotary work-receiving turntable and means mounting said turntable for displacement relative to said cam-cutting tool, said machine being of the type used for cutting a radial cam for use with motion transmission means including a follower and a double-armed lever mounted on a lever pivot and having a rocker arm and a follower arm on which is mounted said follower, said follower arm having an output point spaced from said lever pivot at which a functional output motion is produced along an output motion path as a function of the speed of rotation of said cam, the development of said cam and the geometry of said motion transmission means: an analog linkage corresponding to said motion transmission means and operatively connected to the means mounting said turntable, said analog linkage comprising a first link corresponding to said rocker arm, a second link corresponding to said follower arm, a third link corresponding to the distance between the axis of said cam and said lever pivot, a fourth link corresponding to the distance between the axis of said cam and the axis of said follower, and a fifth link of a length related to the total linear amplitude of said functional output motion, said cam-cutting tool being of a diameter equal to the diameter of said follower, and a motion-producing curve generator operatively engaged with said analog linkage for moving same in relation to the rate of rotation of said turntable and in relation to the desired functional output motion for varying the radius of said cam being cut by said machine.

References Cited by the Examiner
UNITED STATES PATENTS

| | | | |
|---|---|---|---|
| 2,300,698 | 11/1942 | Pentz | 90—13 |
| 3,106,868 | 10/1963 | Boehm | 90—13 |
| 3,179,012 | 4/1965 | Schellens | 90—13.4 |

FOREIGN PATENTS

| | | |
|---|---|---|
| 957,711 | 2/1957 | Germany. |

WILLIAM W. DYER, Jr., *Primary Examiner.*

GERALD A. DOST, *Assistant Examiner.*